United States Patent
Tsiatsis et al.

(10) Patent No.: US 12,328,571 B2
(45) Date of Patent: Jun. 10, 2025

(54) SECURING THE USER PLANE PATH FOR A GROUP COMMUNICATION SESSION BASED ON A SECURITY POLICY COMMON TO ALL DEVICES IN THE GROUP

(71) Applicant: Telefonaktiebolaget LM Ericsson (publ), Stockholm (SE)

(72) Inventors: Vlasios Tsiatsis, Solna (SE); Noamen Ben Henda, Vällingby (SE); Monica Wifvesson, Lund (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 759 days.

(21) Appl. No.: 17/424,057

(22) PCT Filed: Jan. 21, 2020

(86) PCT No.: PCT/SE2020/050049
§ 371 (c)(1),
(2) Date: Jul. 19, 2021

(87) PCT Pub. No.: WO2020/153894
PCT Pub. Date: Jul. 30, 2020

(65) Prior Publication Data
US 2022/0124488 A1 Apr. 21, 2022

Related U.S. Application Data

(60) Provisional application No. 62/794,906, filed on Jan. 21, 2019.

(51) Int. Cl.
*H04W 12/033* (2021.01)
*H04L 9/40* (2022.01)
(Continued)

(52) U.S. Cl.
CPC ......... *H04W 12/033* (2021.01); *H04L 63/104* (2013.01); *H04W 4/08* (2013.01); *H04W 12/76* (2021.01); *H04W 76/40* (2018.02)

(58) Field of Classification Search
CPC ..... H04W 12/033; H04W 4/08; H04W 12/76; H04W 76/40; H04L 63/104; H04L 12/1818
See application file for complete search history.

(56) References Cited

U.S. PATENT DOCUMENTS

2013/0103939 A1* 4/2013 Radpour ............... H04W 12/50
713/152
2019/0387401 A1* 12/2019 Liao ....................... H04W 4/08
(Continued)

FOREIGN PATENT DOCUMENTS

| CN | 107786511 A | 3/2018 |
|---|---|---|
| EP | 3177052 A1 | 6/2017 |
| WO | 2018194971 A1 | 10/2018 |

OTHER PUBLICATIONS

3GPP, "3GPP TS 23.501 V15.4.0", 3rd Generation Partnership Project; Technical Specification Group Services and System Aspects; System Architecture for the 5G System; Stage 2 (Release 15), Dec. 2018, 1-236.
(Continued)

*Primary Examiner* — Mazda Sabouri
(74) *Attorney, Agent, or Firm* — Murphy, Bilak & Homiller, PLLC

(57) ABSTRACT

A network node (26, 400) is configured for use in a wireless communication network (10). The network node (26, 400) receives a request to establish a session (14-1) for a device (12-1) in a group (18), e.g., a 5G Local Area Network group (18). The network node (26, 400) determines a user plane security policy (24-1) for the session (!4-1), based on a user plane security policy (28) for the group (18). The user plane
(Continued)

security policy (28) for the group (18) may specify a policy for securing a user plane path of a session for any device in the group (18). The network node (26, 400) may then transmit, to an access node of the wireless communication network (10), control signaling indicating the determined user plane security policy (24-1).

24 Claims, 14 Drawing Sheets

(51) Int. Cl.
*H04W 4/08* (2009.01)
*H04W 12/76* (2021.01)
*H04W 76/40* (2018.01)

(56) References Cited

U.S. PATENT DOCUMENTS

2020/0059761 A1* 2/2020 Li .................. H04L 63/0892
2021/0185538 A1* 6/2021 Zhang ............... H04W 12/122
2021/0409941 A1* 12/2021 Rajendran ............ H04W 80/02

OTHER PUBLICATIONS

3GPP, "3rd Generation Partnership Project; Technical Specification Group Services and System Aspects; Procedures for the 5G System; Stage 2 (Release 15)", TS 23.502 V15.4.1, Jan. 2019, 1-347.

3GPP, "3rd Generation Partnership Project; Technical Specification Group Services and System Aspects; Procedures for the 5G System; Stage 2 (Release 15)", 3GPP TS 23.502 V15.3.0, Sep. 2018, 1-330.

3GPP, "3rd Generation Partnership Project; Technical Specification Group Services and System Aspects; Security architecture and procedures for 5G system (Release 15)", 3GPP TS 33.501 V15.3.1, Dec. 2018, 1-181.

3GPP, "3rd Generation Partnership Project; Technical Specification Group Services and System Aspects; Security architecture and procedures for 5G system (Release 15)", 3GPP TS 33.501 V15.1.0, Jun. 2018, 1-152.

3GPP, "3rd Generation Partnership Project; Technical Specification Group Services and System Aspects; Study on enhancement of 5GS for Vertical and LAN Services (Release 16)", TR 23.734 V16.0.0 (Dec. 2018), Dec. 2018, 1-107.

3GPP, "3rd Generation Partnership Project; Technical Specification Group Services and System Aspects; System Architecture for the 5G System; Stage 2 (Release 15)", 3GPP TS 23.501 V15.3.0, Sep. 2018, 1-226.

Ericsson, "New security solution for handling UP security policy for a 5GLAN Group", 3GPP TSG SA WG3 (Security) Meeting #94, S3-190290 (revision of S3-19xabc), Kochi, India, Jan. 28-Feb. 1, 2019, 1-2.

Huawei, et al., "5GLAN group management procedures", 3GPP, TSG-SA WG2 Meeting #130, S2-1900674, Kochi, India, Jan. 21-25, 2019, 1-11.

Huawei, et al., "Support one to many communication for 5GLAN", 3GPP TSG-SA WG2 Meeting #130, S2-1900597, Kochi, India, Jan. 21-25, 2019, 1-11.

3GPP, "3GPP TS 33.819 V0.2.0", 3rd Generation Partnership Project; Technical Specification Group Services and System Aspects; Study on security for 5GS enhanced support of Vertical and LAN Services; (Release 16), Dec. 2019, 1-18.

* cited by examiner

SECURING THE USER PLANE PATH FOR A GROUP COMMUNICATION SESSION BASED ON A SECURITY POLICY COMMON TO ALL DEVICES IN THE GROUP

TECHNICAL FIELD

The present application relates generally to a wireless communication network, and relates more particularly to the security of a user plane path in such a network.

BACKGROUND

One of the main new features in $5^{th}$ Generation (5G) Security is the separation of the activation between the Control and User Plane (UP) security in the Access Stratum (AS) as described in $3^{rd}$ Generation Partnership Project (3GPP) Technical Specification (TS) 33.501 v15.3.1. Activation in this context means the starting point of the ciphering and integrity protection on the air interface between the user equipment (UE) and the Radio Access Network (RAN) (Node), i.e. gNB or ng-eNB. Like in the previous generation system (namely, the Evolved Packet System, EPS), Control Plane (CP) security is activated by a run of the AS Security Mode Command (SMC) procedure which is a roundtrip of radio resource control (RRC) messages between the UE and the RAN node. The procedure allows the negotiation of the cryptographic algorithms, the establishment of the ciphering and integrity protection keys, and the activation of the secure mode of the protocol.

The activation of the UP security takes place during the protocol data unit (PDU) Session establishment procedure which is a Non-Access Stratum (NAS) procedure between the UE and the Session Management Function (SMF) in the core network (CN). The activation is based on the UP Security Policy, which is a PDU Session-specific parameter determined by the SMF and signaled to the RAN node during the procedure run. The UP Security Policy indicates whether integrity or/and ciphering are to be activated for the session being set-up. The RAN node will then take a decision and signal the decision to the UE via RRC signaling. The result is that, based on the so-called decision, all the Data Radio Bearers (DRBs) serving the PDU Session in question will have the same ciphering and integrity protection activation status, i.e. either all off or all on. See TS 33.501 v15.3.1.

The PDU Session-specific nature of the UP Security Policy advantageously provides flexibility for tailoring security on a session by session basis. This flexibility nonetheless complicates security considerations in some contexts, such as in the case of 5G Local Area Network (5GLAN) group communication.

SUMMARY

It is an object of the invention to enable improved security related to group communication, e.g., 5GLAN group communication.

Some embodiments herein secure the user plane path of a session for a device, e.g., by applying confidentiality protection and/or integrity protection to the user plane path. Notably, some embodiments secure the user plane path of the session for the device, taking into account the device's participation in group communication, e.g., 5G Local Area Network (5GLAN) group communication. One or more embodiments for example secure the user plane path of the session for the device to an extent that is applicable for each device participating in the group communication. The user plane path of the session for the device may for instance be secured to the same extent, or to at least the same minimum extent, as that to which the user plane path of the session for each other device participating in the group communication is to be secured. Such effectively enforces a security policy that is commonly applicable to devices participating in group communication, e.g., a policy that the user plane path of the session for each device participating in the group communication is to be secured to the same extent, or to at least the same minimum extent. Securing the user plane path of the session for each device participating in the group communication to the same extent, or to at least the same minimum extent, advantageously safeguards the group communication as a whole against attack. Indeed, with the group communication traversing each of the user plane paths for respective devices in the group, the user plane path that is secured to the least extent dictates the extent to which the group communication is actually protected against attack. Some embodiments thereby advantageously ensure that the security applied by any one device in the group does not disproportionately jeopardize the security for the whole group.

More particularly, embodiments herein include a method performed by a network node in a wireless communication network. The method may comprise receiving, at the network node, a request to establish a session for a device in a group. The method may further comprise determining a user plane security policy for the session, based on a user plane security policy for the group. The user plane security policy for the group may specify a policy for securing a user plane path of a session for any device in the group. In some embodiments, the method also comprises transmitting, from the network node to an access node of the wireless communication network, control signaling indicating the determined user plane security policy.

In some embodiments, according to the user plane security policy for the group, a user plane security policy for a session of any device in the group is to be the same as a user plane security policy for a session of any other device in the group In some embodiments, the user plane security policy for the session is determined to be the same as a user plane security policy for a different session for a different device in the group.

In other embodiments, according to the user plane security policy for the group, a user plane security policy for a session of any device in the group is to specify a minimum level of security.

In some embodiments, the user plane security policy for the group indicates whether confidentiality protection is required or not needed for securing a user plane path of a session for any device in the group; and/or whether integrity protection is required or not needed for securing a user plane path of a session for any device in the group. In other embodiments, the user plane security policy for the group indicates: whether confidentiality protection is required, preferred, or not needed for securing a user plane path of a session for any device in the group; and/or whether integrity protection is required, preferred, or not needed for securing a user plane path of a session for any device in the group.

In some embodiments, the method further comprises obtaining the user plane security policy for the group from a node implementing an application function, a node in a data network, a node in an operations and support system, OSS, a node implementing a unified data management, UDM, function, or a node implementing a policy control function, PCF.

In some embodiments, the method further comprises obtaining or generating the group user plane security policy during a procedure for establishing the session.

In some embodiments, the group is a 5GLAN group.

In some embodiments, the group is a restricted set of devices configured to privately communicate amongst each other via the respective sessions for the devices.

In some embodiments, the request indicates a data network name, DNN, associated with the group.

In some embodiments, the network node implements a session management function, SMF, in a 5G core network.

In some embodiments, the group is a restricted set of devices configured to privately communicate amongst each other via a 5G local area network (LAN) type service.

Embodiments herein also include corresponding apparatus, computer programs, and carriers such as non-transitory computer-readable mediums. Embodiments for instance include a network node configured for use in a wireless communication network. The network node is configured (e.g., via communication circuitry and processing circuitry) to receive, at the network node, a request to establish a session for a device in a group. The network node may further be configured to determine a user plane security policy for the session, based on a user plane security policy for the group. The user plane security policy for the group may specify a policy for securing a user plane path of a session for any device in the group. In some embodiments, the network node is also configured to transmit, from the network node to an access node of the wireless communication network, control signaling indicating the determined user plane security policy.

DETAILED DESCRIPTION

Figure 1:
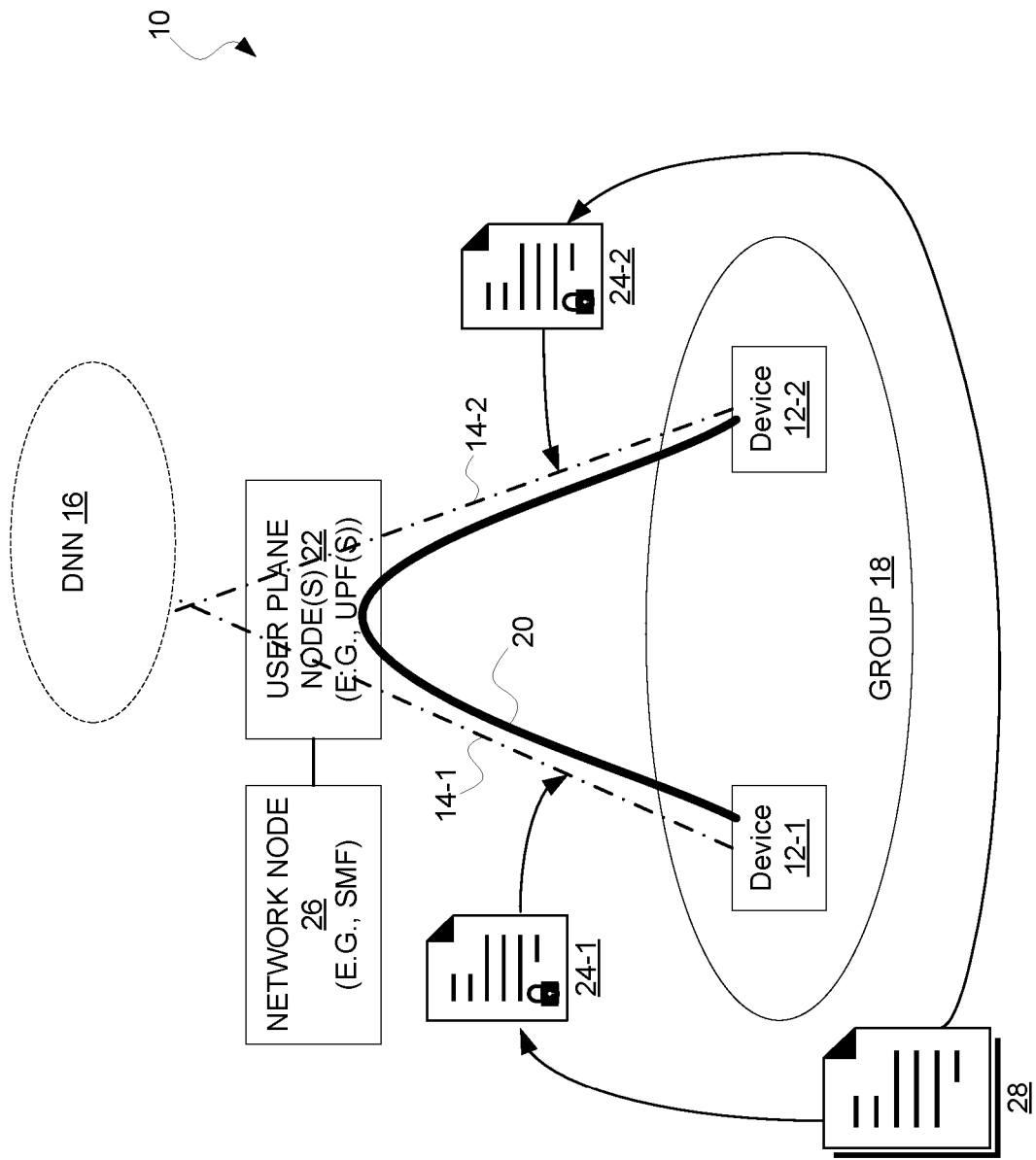
FIG. 1 is a block diagram of a wireless communication network according to some embodiments.

FIG. 1 shows a wireless communication network 10 (e.g., a 5G network) according to some embodiments. As shown, devices 12-1 and 12-2 each establish a respective session 14-1, 14-2 (e.g., a Protocol Data Unit, PDU, session) towards a particular data network (DN), identified by a particular Data Network Name (DNN) 16. This particular DNN 16 is associated with a particular group 18. The group 18 may for instance be a 5G Local Area Network (5GLAN) group. Belonging to the same group 18, devices 12-1 and 12-2 are able to privately communicate with each other. FIG. 1 in this regard shows that the devices 12-1, 12-2 may exchange group communication 20 amongst themselves privately. The group 18 in this sense may represent a restricted set of devices 12-1, 12-2 configured to privately communicate amongst each other via the respective sessions 14-1, 14-2 for the devices 12-1, 12-2. Where the group 18 is a 5GLAN group, for example, the group 18 may represent a restricted set of devices 12-1, 12-2 configured to privately communicate amongst each other via a 5G LAN type service.

Communication, such as private communication, amongst devices 12-1 and 12-2 in the group 18 may be achieved in some embodiments by anchoring the user plane paths of the devices' sessions 14-1, 14-2 in the same user plane node (e.g., implementing a User Plane Function, UPF) or in multiple interconnected user plane nodes. FIG. 1 for example shows that the user plane paths of the devices' sessions 14-1, 14-2 are anchored in user plane node(s) 22. Privacy of communication among members of the group is achieved by e.g. encryption of traffic among the group member devices, and the traffic does not necessarily have to be sent via UPFs.

The user plane paths of the devices' sessions 14-1, 14-2 may each be secured. For example, each user plane path may be secured by applying integrity protection and/or confidentiality protection (i.e., encryption) to group communications 20 transported on that path. In some embodiments in this regard, individual user plane security policies 24-1, 24-2 for the respective sessions 14-1, 14-2 govern the extent to which the user plane paths of the respective sessions 14-1, 14-2 are to be secured. That is, user plane security policy 24-1 for session 14-1 governs the extent to which the user plane path of the session 14-1 for device 12-1 is to be secured, whereas user plane security policy 24-2 for session 14-2 governs the extent to which the user plane path of the session 14-2 for device 12-2 is to be secured. Each user plane security policy 24-1, 24-2 may for instance specify whether integrity protection on the user plane path is required or not needed (or preferred), and/or specify whether confidentiality protection (i.e., encryption) on the user plane path is required or not needed (or preferred).

A network node 26 (e.g., implementing a Session Management Function, SMF in a 5G core network) may determine the individual user plane security policies 24-1, 24-2 for the respective sessions 14-1, 14-2, i.e., the policies 24-1, 24-2 that are to respectively apply to and secure the user plane paths of the devices' sessions 14-1, 14-2. The network node 26 may for instance make this determination when the sessions 14-1, 14-2 are being set up. The network node 26 in some embodiments then signals the user plane security policies 24-1, 24-2 to the radio access network (RAN) (not shown), so that the RAN can put the policies 24-1, 24-2 into effect for the respective sessions 14-1, 14-2.

Notably, some embodiments secure the user plane path of the session for a any given device, taking into account that device's participation in the group 18. One or more embodiments for example secure the user plane path of the session 14-1 for device 12-1 to an extent that is applicable for every device participating in the group 18. The user plane path of the session 14-1 for the device 12-1 may for instance be secured to the same extent, or to at least the same minimum extent, as that to which the user plane path of the session for every other device participating in the group 18 is to be secured. For example, the user plane path of the session 14-1 for the device 12-1 may be secured to the same extent, or to at least the same minimum extent, as that to which the user plane path of the session 14-2 for device 12-2 is secured.

Such effectively enforces a security policy 28 that is commonly applicable to devices 12-1, 12-2 participating in the group 18. This security policy 28 may be referred to for convenience as a group user plane security policy, i.e., a user plane security policy for the group 18. The group user plane security policy 28 may for instance specify that the user plane path of the session 14-1, 14-2 for each device 12-1, 12-2 participating in the group 18 is to be secured to the same extent, or to at least the same minimum extent. Broadly, then, the user plane security policy 28 for the group 18 specifies a policy for securing a user plane path of a session for any device in the group 18, e.g., such that the user plane path of the session for each device in the group 18 is to be secured based on the user plane security policy 28 for the group 18.

Securing the user plane path of the session 14-1, 14-2 for each device 12-1, 12-2 participating in the group 18 to the same extent, or to at least the same minimum extent, advantageously safeguards the group communication 20 as a whole against attack. Indeed, with the group communication 20 traversing each of the user plane paths for respective devices 12-1, 12-2 in the group 18, the user plane path that is secured to the least extent dictates the extent to which the group communication 20 is actually protected against attack. Some embodiments thereby advantageously ensure that the security applied by any one device in the group 18 does not disproportionately jeopardize the security for the whole group.

The group user plane security policy 28 may do so for instance by specifying that the user plane security policy for the session of any device in the group 18 is to be the same as the user plane security policy for the session of any other device in the group. For example, the group user plane security policy 28 may indicate that the individual user plane security policies 24-1, 24-2 are to be the same, e.g., by specifying the same policy for integrity protection and/or the same policy for confidentiality protection. That is, the individual user plane security policies 24-1, 24-2 are to each specify the same choice for whether integrity protection is required or not needed (or preferred), and/or are to each specify the same choice for whether confidentiality protection is required or not needed (or preferred). According to such a group user plane security policy 28, then, the network node 26 may determine the user plane security policy 14-1 for securing the user plane path of the session 14-1 for device 12-1 to be the same as the user plane security policy 14-2 for securing the user plane path of the session 14-2 for device 12-2.

In other embodiments, the group user plane security policy 28 may specify that user plane security for a session of any device in the group 18 is to specify a minimum level of security. For example, the group user plane security policy 28 may indicate that the individual user plane security policies 24-1, 24-2 are to each specify a minimum level of integrity protection and/or a minimum level confidentiality protection. In this case, different choices for whether integrity protection is required or not needed (or, in some embodiments, preferred) may represent different levels of integrity protection, where the choice of "required" provides a higher level of integrity protection than "not needed" (and, in some embodiments, "preferred" may provide a lower level of integrity protection than "required" but a higher level of integrity protection than "not needed"). Similarly, different choices for whether confidentiality protection is required or not needed (or, in some embodiments, preferred) may represent different levels of confidentiality protection, where the choice of "required" provides a higher level of confidentiality protection than "not needed" (and, in some embodiments, "preferred" may provide a lower level of confidentiality protection than "required" but a higher level of confidentiality protection than "not needed"). According to such a group user plane security policy 28, then, the network node 26 may determine the user plane security policy 14-1 for the session 14-1 is to specify a level of integrity protection and/or a level of confidentiality protection that is at least as high as the level of integrity protection and/or the level of confidentiality protection specified by the user plane security policy 14-2 for the session 14-2. For example, if the user plane security policy 14-2 for securing the user plane path of the session 14-2 for device 12-2 specifies "required" for integrity protection and "not needed" for confidentiality protection, the network node 26 may determine the user plane security policy 14-1 for securing the user plane path of the session 14-1 for device 12-1 is to specify "required" for integrity protection" and either "not needed" or "required" (or, in some embodiments, "preferred") for confidentiality protection.

Generally, then, no matter the particular implementation of the group user plane security policy 28, the network node 26 according to some embodiments determines the user plane security policy 14-1 for securing the session 14-1 for device 12-1, based on the user plane security policy 28 for the group 18. And, similarly, the network node 26 determines the user plane security policy 14-2 for the session 14-2 for device 12-2, also based on the user plane security policy 28 for the group 18.

Note that, in some embodiments, the user plane security policy 28 for the group 18 is specified and/or stored in the same way as a user plane security policy 24-1, 24-2 for a session 14-1, 14-2 or an individual device 12-1, 12-2, except that it applies commonly for the group 18. In one or more embodiments, for instance, the user plane security policy 28 for the group 18 specifies whether integrity protection on the user plane path of the session for every device in the group 18 is required or not needed (or, in some embodiments, preferred), and/or specifies whether confidentiality protection (i.e., encryption) on the user plane path of the session for every device in the group 18 is required or not needed (or, in some embodiments, preferred). In this case, the network node 26 determines the user plane security policy 24-1 or 24-2 for a device in the group to be the same as the user plane security policy 28 for the group 18. In other embodiments, the user plane security policy 28 for the group 18 indicates whether a minimum level of integrity protection to be specified by the user plane security policy for the session of any device in the group 18 is "required" or "not needed" (or, in some embodiments, "preferred"), and/or specifies whether a minimum level of confidentiality protection (i.e., encryption) to be specified by the user plane security policy for the session of any device in the group 18 is "required" or "not needed" (or, in some embodiments, "preferred"). In this case, the network node 26 may check the user plane security policy 24-1 or 24-2 for a device in the group 18 against the user plane security policy 28 for the group 18, and accept or reject the setup of the session for the device depending on whether the user plane security policy 24-1 or 24-2 meets the minimum level of security specified by the group user plane security policy 28. In these and other embodiments, then, the group user plane security policy 28 may be obtained from, or stored in, a data structure such as a database.

In other embodiments, though, the user plane security policy 28 for the group 18 simply constitutes one or more rules at the network node 26, e.g., specifying how the user plane security policies 24-1, 24-2 for the devices 12-1, 12-2 in the group 18 are to relate to one another and/or to a minimum security level requirement. The user plane security policy 28 for the group 18 may for example just constitute a rule at the network node 26 indicating that the user plane security policies 24-1, 24-2 for the respective sessions 14-1, 14-2 of devices 12-1, 12-2 in the group 18 are to be the same as one another.

Regardless, the network node 26 in some embodiments may receive or otherwise obtain the user plane security policy 28 for the group 18. The network node 26 may for instance obtain the user plane security policy 28 for the group 18 from another node (not shown), such as a node implementing an application function (AF), a node in a data network (DN), a node in an operations and support system (OSS), a node implementing a unified data management (UDM) function, or a node implementing a policy control function (PCF). In other embodiments, the network node 26 may itself generate the user plane security policy 28 for the group 18, e.g., dynamically on-the-fly. No matter how the network node 26 obtains the policy 26 for the group 18, the network node 26 may do so during a procedure for establishing a session for a device in the group. Indeed, it is during this procedure that the network node 26 may determine the user plane security policy for securing the user plane path of the session to be established.

Figure 2:
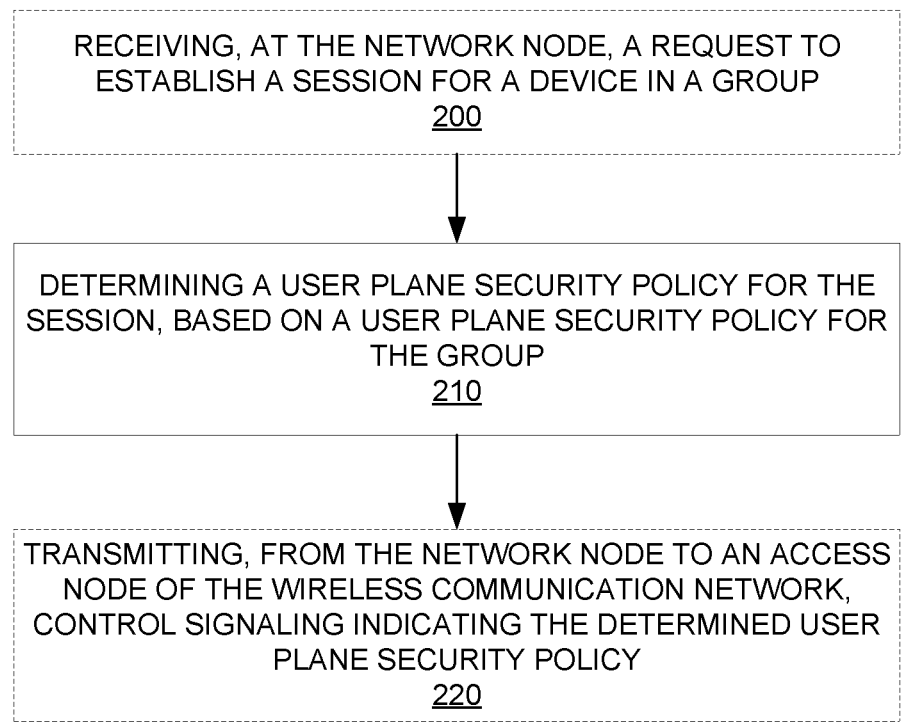
FIG. 2 is a logic flow diagram of a method performed by a network node according to some embodiments.

In view of the above modifications and variations, FIG. 2 depicts a method performed by a network node 26 (e.g., implementing an SMF) in a wireless communication network 10 (e.g., a 5G network). The method in some embodiments includes receiving, at the network node 26, a request to establish a session 14-1 for a device 12-1 in a group 18 (e.g., a 5GLAN group) (Block 200). The request may for example indicate a data network name (DNN) associated with the group 18. Regardless, the method in some embodiments may include determining a user plane security policy 24-1 for the session 14-1 (i.e., the user plane security policy 24-1 for securing a user plane path of the session 14-1), based on a user plane security policy 28 for the group 18 (i.e., a group user plane security policy 28) (Block 210). The user plane security policy 28 for the group 18 may specify a policy for securing a user plane path of a session for any device in the group 18. In other words, the user plane security policy 28 for the group 18 may specify a policy for securing user plane paths of any respective sessions 14-1, 14-2 for devices 12-1, 12-2 in the group 18. In some embodiments, the method further includes transmitting, from the network node 26 to an access node of the wireless communication network 10, control signaling indicating the determined user plane security policy 24-1 (Block 220).

Figure 3:
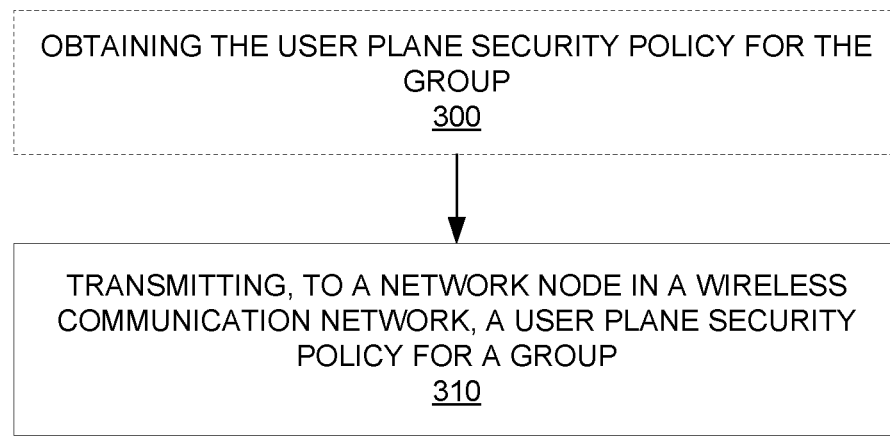
FIG. 3 is a logic flow diagram of a method performed by a node according to some embodiments.

FIG. 3 depicts a method in accordance with other particular embodiments. The method includes transmitting, to a network node 26 in a wireless communication network 10, a user plane security policy 28 for a group 18 (i.e., a group user plane security policy 28) (Block 310). The user plane security policy 28 for the group 18 may specify a policy for securing a user plane path of a session for any device in the group 18. In other words, the user plane security policy 28 for the group 18 may specify a policy for securing user plane paths of any respective sessions 14-1, 14-2 for devices 12-1, 12-2 in the group 18. Regardless, the method may also include obtaining the group user plane security policy 28 (Block 300).

In some embodiments, according to the user plane security policy 28 for the group 18, a user plane security policy for a session of any device in the group 18 is to be the same as a user plane security policy for a session of any other device in the group 18. In other embodiments, according to the user plane security policy 28 for the group 18, a user plane security policy for a session of any device in the group 18 is to specify a minimum level of security.

In some embodiments, the user plane security policy 28 for the group 18 indicates: whether confidentiality protection is required or not needed for securing a user plane path of a session for any device in the group 18; and/or whether integrity protection is required or not needed for securing a user plane path of a session for any device in the group 18. In other embodiments, the user plane security policy 28 for the group 18 indicates: whether confidentiality protection is required, preferred, or not needed for securing a user plane path of a session for any device in the group 18; and/or whether integrity protection is required, preferred, or not needed for securing a user plane path of a session for any device in the group 18.

In some embodiments, the group 18 is a 5GLAN group. Alternatively or additionally, the group 18 is a restricted set of devices 12-1, 12-2 configured to privately communicate amongst each other via the respective sessions for the devices 12-1, 12-2. Alternatively or additionally, the group 18 is a restricted set of devices configured to privately communicate amongst each other via a 5G local area network (LAN) type service.

Although referred to as a group user plane security policy 28 in some embodiments, the policy 28 may also be referred to as a local area network (LAN) user plane security policy or simply a network user plane security policy.

Note that the apparatuses described above may perform the methods herein and any other processing by implementing any functional means, modules, units, or circuitry. In one embodiment, for example, the apparatuses comprise respective circuits or circuitry configured to perform the steps shown in the method figures. The circuits or circuitry in this regard may comprise circuits dedicated to performing certain functional processing and/or one or more microprocessors in conjunction with memory. For instance, the circuitry may include one or more microprocessor or microcontrollers, as well as other digital hardware, which may include digital signal processors (DSPs), special-purpose digital logic, and the like. The processing circuitry may be configured to execute program code stored in memory, which may include one or several types of memory such as read-only memory (ROM), random-access memory, cache memory, flash memory devices, optical storage devices, etc. Program code stored in memory may include program instructions for executing one or more telecommunications and/or data communications protocols as well as instructions for carrying out one or more of the techniques described herein, in several embodiments. In embodiments that employ memory, the memory stores program code that, when executed by the one or more processors, carries out the techniques described herein.

Figure 4:
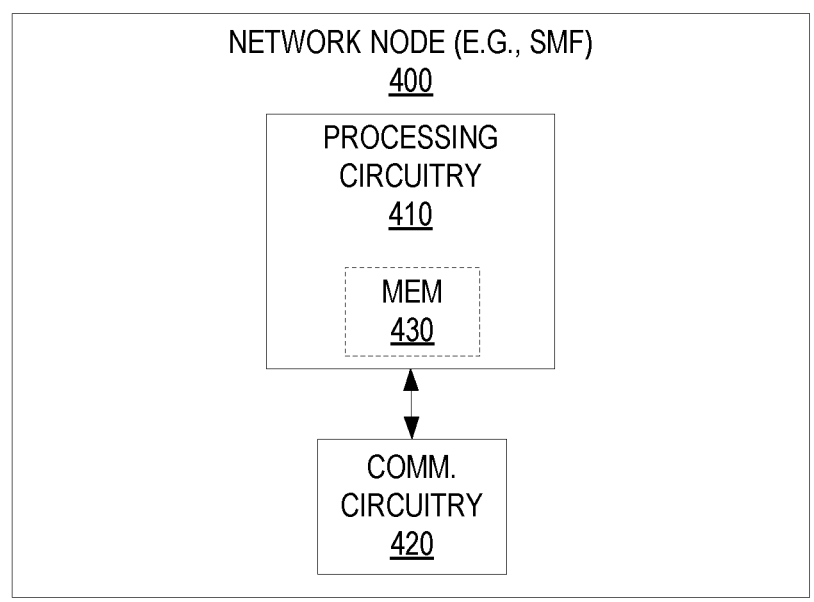
FIG. 4 is a block diagram of a network node according to some embodiments.

FIG. 4 for example illustrates a network node 400 (e.g., network node 26) as implemented in accordance with one or more embodiments. As shown, the network node 400 includes processing circuitry 410 and communication circuitry 420. The communication circuitry 420 (e.g., radio circuitry) is configured to transmit and/or receive information to and/or from one or more other nodes, e.g., via any communication technology. The processing circuitry 410 is configured to perform processing described above, e.g., in FIG. 2, such as by executing instructions stored in memory 430. The processing circuitry 410 in this regard may implement certain functional means, units, or modules.

Figure 5:
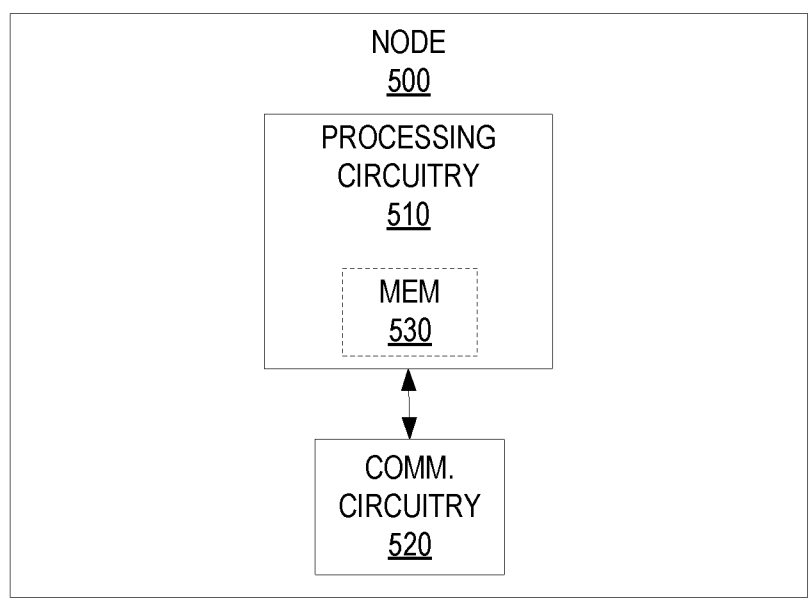
FIG. 5 is a block diagram of a node according to some embodiments.

FIG. 5 illustrates a node 500 as implemented in accordance with one or more embodiments. As shown, the node 500 includes processing circuitry 510 and communication circuitry 520. The communication circuitry 520 is configured to transmit and/or receive information to and/or from one or more other nodes, e.g., via any communication technology. The processing circuitry 510 is configured to perform processing described above, e.g., in FIG. 3, such as by executing instructions stored in memory 530. The processing circuitry 510 in this regard may implement certain functional means, units, or modules.

Those skilled in the art will also appreciate that embodiments herein further include corresponding computer programs.

A computer program comprises instructions which, when executed on at least one processor of an apparatus, cause the apparatus to carry out any of the respective processing described above. A computer program in this regard may comprise one or more code modules corresponding to the means or units described above.

Embodiments further include a carrier containing such a computer program. This carrier may comprise one of an electronic signal, optical signal, radio signal, or computer readable storage medium.

In this regard, embodiments herein also include a computer program product stored on a non-transitory computer readable (storage or recording) medium and comprising instructions that, when executed by a processor of an apparatus, cause the apparatus to perform as described above.

Embodiments further include a computer program product comprising program code portions for performing the steps of any of the embodiments herein when the computer program product is executed by a computing device. This computer program product may be stored on a computer readable recording medium.

Additional embodiments will now be described. At least some of these embodiments may be described as applicable in certain contexts and/or wireless network types for illustrative purposes, but the embodiments are similarly applicable in other contexts and/or wireless network types not explicitly described. In some embodiments below, for example, a 5G wireless communication network exemplifies wireless communication network 10, a 5GLAN exemplifies a group 18, and a wireless device or user equipment exemplifies a device in a group.

The 5$^{th}$ Generation (5G) System will support verticals such as factories and enterprises deploying their own 5G Systems for connectivity either independently or via an operator e.g. offering the service in a restricted network. For example, in the context of an enterprise environment, equipment like smartphones and laptops may communicate with each other within a 5G local area network (5GLAN) Group. Key issues to be addressed in this regard include group management aspects, as well as how the connections are setup in order for the members of a group to communicate with each other. See, e.g., the 3$^{rd}$ Generation Partnership Project (3GPP) Technical Report (TR) 23.734 v16.0.0.

In one solution, each user equipment (UE) member of a group is identified by the Generic Public Subscription Identifier (GPSI) which is a public identifier to be used with entities external to the 5G Core (5GC) (see 3GPP TS 23.501 v15.4.0). For example, during the secondary authentication procedure, specific GPSI, whenever available, is sent from the 5GC, and more precisely the Session Management Function (SMF), to the Data Network (DN) in order to identify a specific UE (see TS 23.502 v15.4.1).

Each 5GLAN group is associated with a specific Data Network Name (DNN) (See TS 23.501 v15.4.0). The DNN is signaled during the Protocol Data Unit (PDU) Session establishment procedure from a UE to the Core Network (CN) in order to identify with which DN the UE wants to establish a User Plane (UP) connection. See TS 23.502 v15.4.1. In the 5GLAN solution, all the PDU Sessions towards a particular DNN, and thus related to a particular group, are managed by the same SMF. From a UE perspective, in order to communicate with a particular 5GLAN Group, the UE must establish a PDU Session indicating the DNN associated with that particular group. The CN will then make sure that the same SMF handling that group is the one selected for managing this member session.

However, it becomes problematic if for a given group it is allowed to use different UP Security Policies with the UE members during group communication sessions. As a consequence, the security properties of the group communication are determined by the security properties of the weakest communication path. In other words, if a communication path between a UE_1, involved in the group session, and a RAN node N_1 is unencrypted while all the other communication paths between all other UEs and the RAN nodes are encrypted, the effect is that an attacker listening to the radio communication between the UE_1 and N_1 will be able to capture all the group communication data unencrypted although the other UEs encrypt the data.

Certain aspects of the present disclosure and their embodiments may provide solutions to these or other challenges. Some embodiments ensure that UEs participating in a group (e.g., in a Vertical LAN setup) will be configured in a such a way that all of them will have the same security policy or the same security properties for the communication links between UEs that belong to the same group (and a DNN). According to some embodiments, then, each 5GLAN group includes among other already existing attributes, a 5GLAN Group User Plane Security Policy (GUPSP). In some embodiments, the GUPSP is dynamically created and managed by an AF or external entity in DN or operator OSS entity, etc. upon the creation of the 5GLAN group. A specific GUPSP setting can be interpreted as the same for all UE PDU sessions or as the minimum security policy for each UE PDU session. Upon change of the GUPSP by the entities stated above (AF, OSS entity, etc) the active PDU sessions could remain as is or invalidated depending on operator policies. The SMF could perform these actions upon the PDU establishment and enforcement of the same or minimum policy upon consulting the GUPSP stored in the same node as the 5GLAN group description.

Certain embodiments may provide one or more of the following technical advantage(s). Some embodiments may ensure that security policies for devices in a group (e.g., 5GLAN group) protect user plane communications to the same extent (or to the same minimum extent in some embodiments), so that the security policy for one device in the group does not jeopardize security for the whole group.

In view of the embodiments above, the present disclosure generally includes the following embodiments, e.g., which may address one or more of the issues disclosed herein. Some embodiments include a method performed by a network node (e.g., implementing an SMF) in a wireless communication network (e.g., a 5G network). The method in some embodiments includes receiving, at the network node, a request to establish a session for a device in a group (e.g., a 5GLAN group). The method in some embodiments may include determining a user plane security policy for securing a user plane path of the session, based on a group user plane security policy specifying a policy for securing user plane paths of any respective sessions for devices in the group. In some embodiments, the method further includes transmitting, from the network node to an access node of the wireless communication network, control signaling indicating the determined user plane security policy.

More particularly, the 5GLAN services are intended to allow UEs belonging to the same 5GLAN group to communicate with each other. In some embodiments, a 5G LAN-type service is a service over the 5G system offering private communication using Internet Protocol (IP) and/or non-IP type communications. Here, private communication refers to communication between two or more UEs belonging to a restricted set of UEs. In this context, 5G LAN-type services with 5G capabilities (e.g. performance, long distance access, mobility, security) allow a restricted set of UEs to communicate amongst each other.

In some embodiments, the 5GS offers the 5G LAN-type service by establishing a user plane composed of one UPF or multiple interconnected UPFs. In some embodiments, the user plane of a 5G LAN-type service has two parts, the Access UP and the Backbone UP. The Access UP contains the UP paths of PDU Sessions. The Backbone UP contains UPFs and Nx connections in between, or Backbone UP bridges the UP paths in the Access UP and the physical LAN (if it exists) in the DN. The Nx connections in the Backbone UP are managed by the 5GC. Traffic routing over Nx in the Backbone UP is configured at the 5G LAN-type service level (i.e. per hop).

Figure 6:
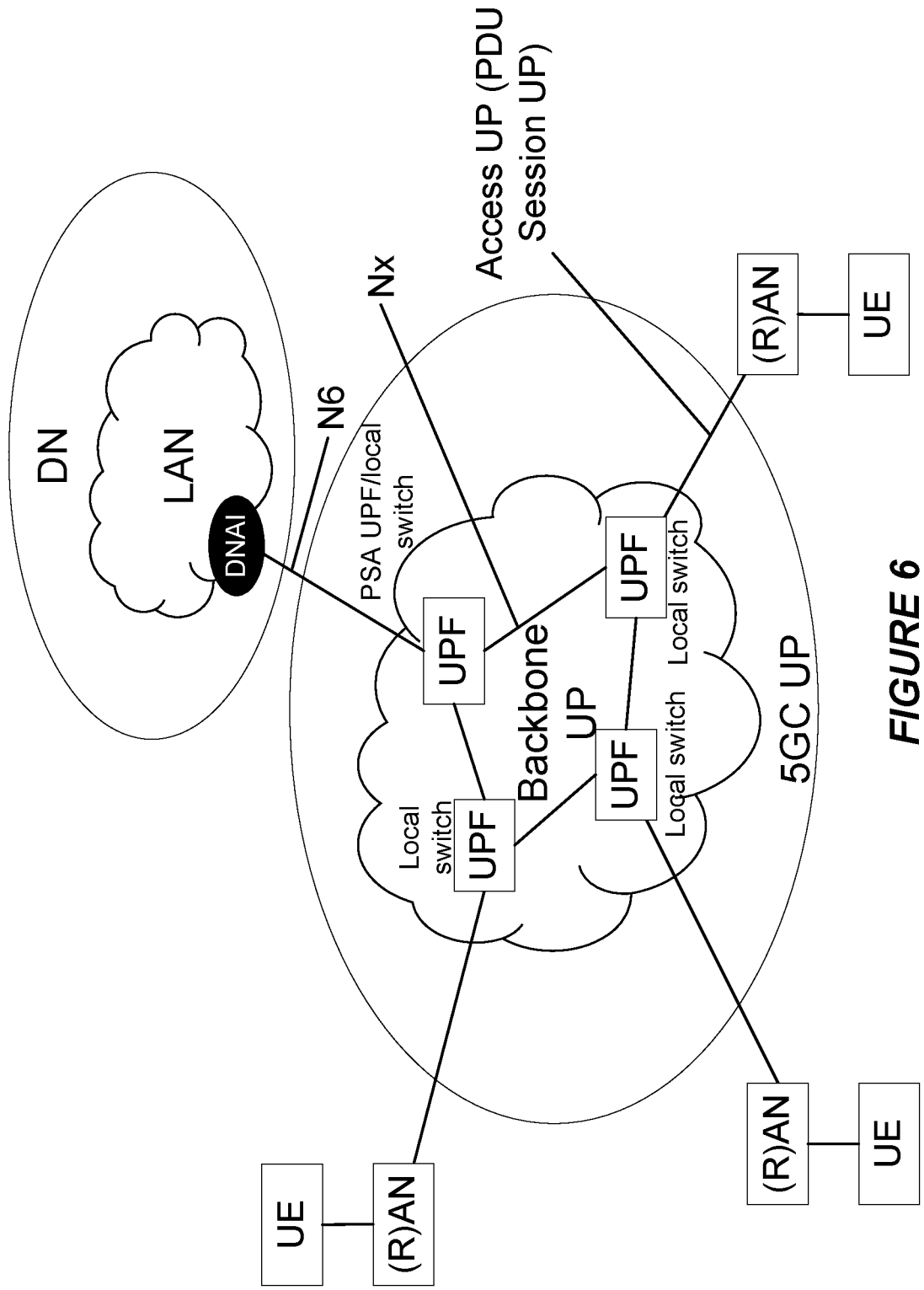
FIG. 6 is a block diagram of the user plane architecture of 5GLAN communication framework according to some embodiments.

FIG. 6 shows the user plane architecture of 5GLAN communication framework according to some embodiments.

In some embodiments, private communication (of 5G LAN-type service) is achieved by shared anchor UPF or by interconnecting two anchor UPFs via an Nx interface. The combination of two anchor UPFs and the Nx interface in between is called an Nx connection.

Figure 7:
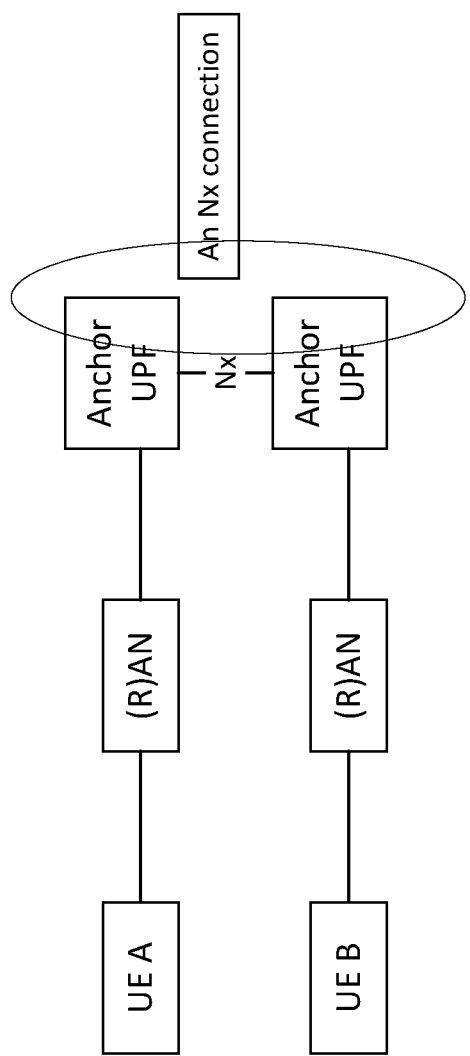
FIG. 7 is a block diagram illustrating user plane functions (UPFs) that are interconnected for establishing private communication between user equipments according to some embodiments.

For example, UE A establishes a PDU session targeting 5GLAN group A, and UE B establishes another PDU session targeting the same group. The user plane of the private communication between UE A and UE B are established by connecting the anchor UPF of UE A's PDU session and that of UE B's PDU session, as shown in FIG. 7, when the two anchor UPFs are not the same UPF.

In some embodiments, UPF can support more than one 5G LAN-type service. To enable 5GLAN communication and isolation for respective 5G LAN-type services, i.e., traffic routing between UE PDU Sessions accessing to the same 5G LAN-type service, the UPF shall associate the traffic from the path of PDU Session to packet handling rules of the corresponding 5G LAN-type service e.g., based on VLAN Tag, UE address, session tunnel information, the packet handling rules are used to route the traffic to the correct UP path based on target address within the Backbone UP of the 5G LAN-type service.

Figure 8:
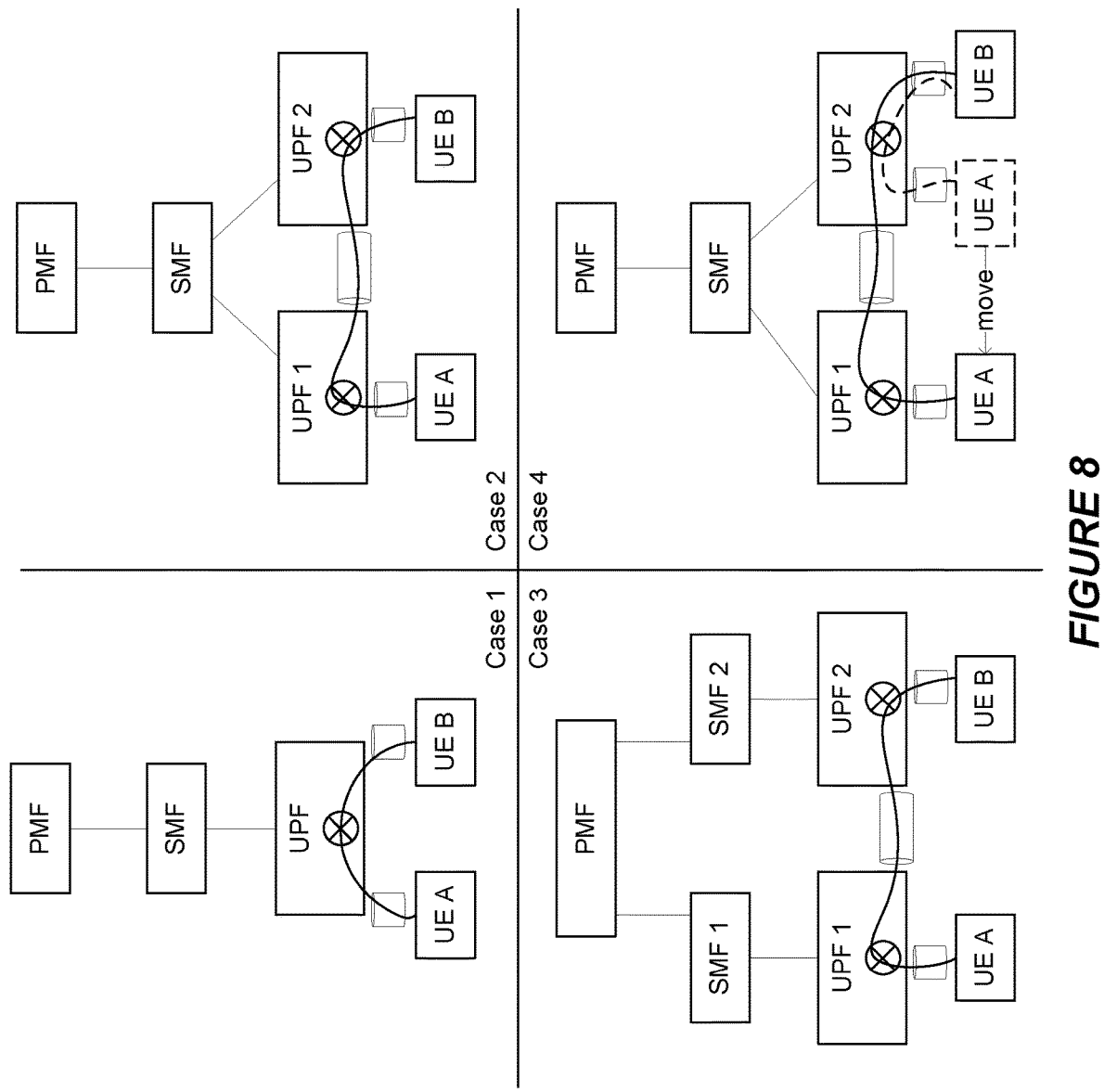
FIG. 8 is a block diagram of different cases for a 5G LAN-type service according to some embodiments.

In some embodiments, when the SMF identifies that the UE PDU Session is accessing to the 5G LAN-type service, in order to bind the UE PDU Session to the 5G LAN-type service, the SMF shall configure packet handling rules for the 5G LAN-type service and the UE PDU Session in the UPF to enable traffic differentiation for proper handling (e.g. marking, steering). 5G LAN-type service can span over wide area mobile network. The 5G network shall coordinate UE PDU sessions that access the same 5G LAN-type service in the cases illustrated in FIG. 8. In these cases, the packet handling rules for the 5G LAN-type service and related PDU Sessions, if required, the Nx connection are used to connect two or more PDU Sessions accessing to the same 5G LAN-type service.

Case 1: Private data communication within one UPF, the only SMF configures the only UPF the packet handling rules for the 5G LAN-type service and PDU Sessions.

Case 2: Private data communication across UPFs managed by the same SMF, the only SMF configures UPF1 the packet handling rules for the 5G LAN-type service and the PDU Sessions anchored at UPF1, while configures UPF2 the packet handling rules for the 5G LAN-type service and the PDU Sessions anchored at UPF2.

Case 3: Private data communication across UPFs managed by different SMFs, the SMF1 configures UPF1 the packet handling rules for the 5G LAN-type service and the PDU Sessions anchored at UPF1, while the SMF2 configures UPF2 the packet handling rules for the 5G LAN-type service and the PDU Sessions anchored at UPF2.

Case 4: Private data communication in case of relocating UPFs due to UE mobility, the SMF unbinds the handover PDU Session to the 5GLAN-type service in the UPF2 and configures UPF1 the packet handling rules for the 5G LAN-type service and the handover PDU Session.

In some embodiments, a Private DNN uniquely identifies a 5GLAN group and all the member UEs of the same group need to establish a PDU Session towards the same Private DNN for 5GLAN group communication. Reserved special labels in the DNN syntax can easily indicate whether it's a Private DNN. Private DNNs might be preconfigured in the network and the group member UEs. They may be also dynamically created on demand by the operator or the group owners/administrators, as part of the 5GLAN group creation. When a new Private DNN is created on demand, the information may be propagated into the concerned network entities (e.g. AMF, SMF, UDR, etc.) in the core network and group member UEs may receive the Private DNN information, together with the related configurations such as the Service Area configuration, via NAS procedures (e.g. Registration or UE Configuration Update).

Figure 9:
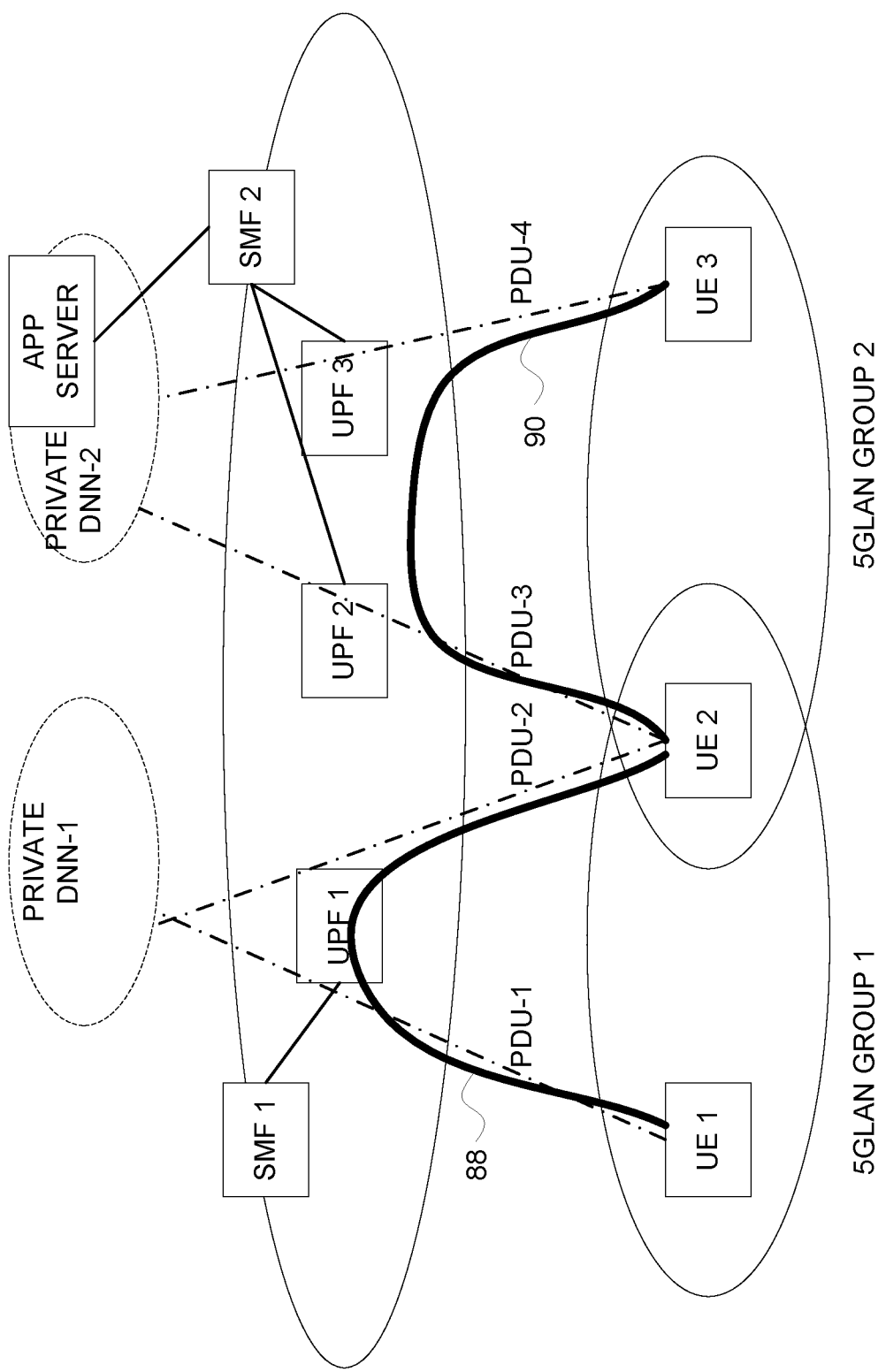
FIG. 9 is a block diagram showing UEs of the same group being assigned the same Session Management Function (SMF) and UPF according to some embodiments.

In some embodiments, a 5GLAN group member UE establishes a dedicated PDU Session towards the target Private DNN before it can communicate with the group. The legacy PDU Session management procedures can be reused for group communication. According to the Private DNN, the network selects the appropriate network functions (e.g. SMFs and UPFs) for the UEs of the same group. For example, all the UEs of the same group and in the same local area may be assigned the same SMF and UPF, as shown in FIG. 9.

In the figure there are two 5GLAN groups: 5GLAN Group 1 which consists of UE1 and U2, and 5GLAN Group 2 which consists of UE2 AND UE3. UE2 is in both Group 1 and Group 2. Each UE establishes the PDU Session (dotted line) towards the Private DNN corresponding to its group. The real group traffic 88 and 90 goes between UPFs selected for the group, under the control of the SMF or App Server, without going to the DN.

One solution in 3GPP Technical Report (TR) 23.374 v16.0.0 assumes that a UE can belong to multiple 5GLAN groups, each associated to a unique DNN. This solution does not depend of the specific details of the 5G LAN groups such as their identifiers.

Another assumption is that the 5GLAN group is assumed to be created and configured by the operator or an Application Function via exposure, Key Issue 4.1 as described in TR 23.374 v16.0.0. Some embodiments herein can be adapted accordingly and do not depend on how groups are created or managed should that be either by an external entity to 3GPP network or by the operator.

Some embodiments herein are based on a Group User Plane Security Policy (GUPSP) intended to define the User Plane Security Policy to be applied for the PDU Sessions pertaining to a given 5GLAN group. Observe that some embodiments focus on the Group User Plane Security Policy, not the User Plane Security Policy defined in TS 33.501 v15.3.1. Some embodiments include mechanisms for how to determine the GUPSP, how to maintain and signal the GUPSP between the different network entities, and how to use the GUPSP to derive the corresponding individual User Plane Security Policy, in the sense of 33.501 v15.3.1, during the setup of the PDU Sessions by the member UEs.

For the purpose of the realization of some embodiments, it is assumed that a 3GPP entity (e.g. UDM) includes the following table for each 5GLAN group.

TABLE 1

5GLAN Group data

| Field | Description |
| --- | --- |
| 5GLAN ID | Identifies the 5GLAN, an example is the DNN |
| GPSI list | List of Generic Public Subscription Identifiers (GPSI). Each GPSI is a public identifier to be used with entities external to the 5G Core (5GC) (see TS 23.501 v15.4.0). |
| Group User Plane Security Policy | UP Security policy for the 5GLAN group |
| Group User Plane Security Policy type | The type of the GUPSP taking two options: "Same" or "Minimum". "Same" means that the GUPSP is to be applied for all PDU sessions established by the UEs identified by the GPSI list. "Minimum" means that all the GUPSP indicated a minimal level of security |

Embodiments Related to the GUPSP Semantics

This group of embodiments relates to the definition of the GUPSP, that is how the GUPSP information is encoded; and the GUPSP semantics, i.e. how the GUPSP information is interpreted since both aspects can in fact be independent. For the latter aspect, the GUPSP can be interpreted to indicate that the User Plane Security Policy is fixed. More precisely the effect of such a fixed GUPSP is that all the PDU Sessions pertaining to group are allocated the same fixed User Plane Security Policy based on the GUPSP for the group in question.

However, as defined now in TS 33.501 v15.3.1, The User Plane Security Policy can be overridden by the target RAN node. In one embodiment, this is prevented so that the activation status of the integrity and confidentiality protection for all the PDU Sessions is the same for all the member UEs. This could be realized by defining the GUPSP similarly to the how the User Plane Security Policy is defined except that the "Preferred" value as described below is not allowed:

In some embodiments, then, each 5GLAN group specification should include (among other specified information in the relevant standards) a group User Plane Security Policy with the following options
  Encryption:
    only "Required" or "Not Needed" is allowed;
    "Preferred" is not allowed:
  Integrity protection:
    only "Required" or "Not Needed" is allowed;
    "Preferred" is not allowed:

The same setting in the group User Plane Security Policy applies to all UE's part of the same 5GLAN group. The effect of this is that the security activation status of all the group related PDU Sessions that are established is the same. These options create the following set of possible group security policies which are denoted by SP={NONE, integrity protection (IP) only, encryption (ENC) only, IP and ENC}

In one example, a group UP security policy having encryption as "required" would mean that all the PDU sessions should be encrypted i.e. a new PDU session establishment request by a UE in the group would be accepted only if the radio network can enable encryption for this PDU session. Otherwise the PDU session will be rejected, i.e. the UE will not be part of the group communication. Similarly, a group UP security policy having encryption as "not required" would mean that all the PDU sessions are unencrypted, i.e. a new PDU session establishment request by a UE in the group would be accepted.

In another embodiment the GUPSP is interpreted in a way that the User Plane Security Policy is assigned in a way to guarantee a minimal level of security. This of course requires that there is a predefined ordering over the set of possible values of the User Plane Security Policy. For example, this order can be defined in the following way. First, assume the following order over the policy values:
  "Not Needed"<"Preferred"<"Required"

The GUPSP for a given 5GLAN group could then be defined using all the values for both encryption and integrity protection. However, now when the SMF allocates the User Plane Security Policy for a PDU Session pertaining to the group, it shall not allocate a value less than the threshold indicated in the GUPSP. If the GUPSP indicates "Preferred" for integrity protection, then the SMF cannot set the integrity protection in the User Plane Security policy to "Not Needed". On the other hand, it is allowed to set it to "Preferred" or "Required".

In one example, then, a group UP security policy having encryption as "preferred" would mean that a new PDU session establishment request by a UE in the group would be accepted but the integrity protection would be enabled if the radio network can do it. If the radio network cannot do it integrity protection would be disabled.

Embodiments Related to the Management and Signaling of the GUPSP

The first group of embodiments relates to the configuration of the GUPSP. In one embodiment, this can be configured alongside the other 5GLAN group information by the group management entity, i.e. either AF or external entity in DN or operator OSS entity, etc. upon the creation of the 5GLAN group.

In one embodiment, the GUPSP is stored in one of the 5G Core functions, e.g. SMF or PCF and signaled to the SMF during the PDU Session establishment procedure. In another embodiment it is stored outside the 5G Core. For example, it can be stored in the DN and signaled to the SMF during PDU Session establishment procedure.

In yet another embodiment, the GUPSP is determined by the SMF on the fly during the establishment of the first PDU Session pertaining to a certain group.

The first embodiment in this group proposes that when UEs join a specific 5GLAN group the security properties of the PDU sessions are pre-configured to one specific value out of the set SP.

Another embodiment proposes that when the security policy is changed for a specific 5GLAN group, the network notifies the UEs to change their behavior only for an upgrade of the security policy e.g. a) from NONE→IP only or NONE→ENC only or NONE→IP & ENC, b) IP only-→ENC only or IP only→IP and ENC, D) ENC only→IP AND ENC. All other changes do not create any signaling. This could be done in order to reduce disruptions in case of time sensitive communications. As a result, as long as the security of the PDU sessions operate at the same or better level, no change is attempted in order to avoid PDU Session re-establishment.

Another embodiment proposes that when the policy is changed for a specific 5GLAN, the network notifies the UEs to change their behavior immediately either the policy is an upgrade or a downgrade. This could be done in order to preserve energy for constrained devices and for the parts of the UP information exchange which don't require stronger protection than necessary.

It may be the case that not all the UEs may be capable of supporting all the possible security policies and as a result UEs may reject the group security policy. In such case another embodiment is to recommend to the operator or the AF a split of the original group of UEs in N (e.g. up to 4 since the possible security policies can be 4 with these examples) different 5GLAN groups with respect to which security policies they could support, and recommend that the operator modifies the original single 5GLAN group with one GUPSP into N 5GLAN groups with respective GUPSP and reviews their deployment setup. In this way the operator may be become aware of the UE limitations and decide to either upgrade the UE capabilities or accept the group splitting.

Procedures

Figure 10:
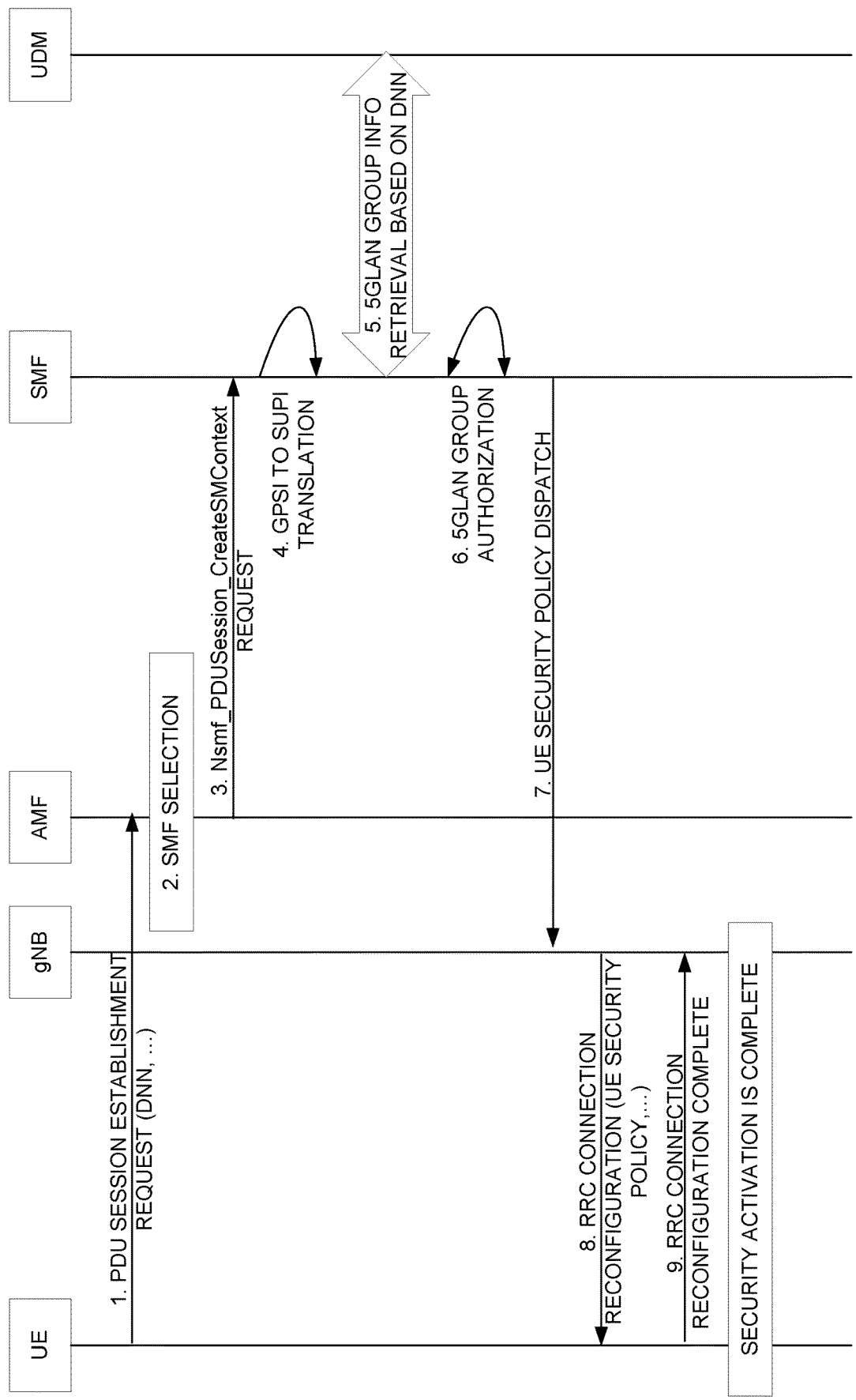
FIG. 10 is a call flow diagram for retrieval of a group user plane security policy from a Unified Data Management (UDM) Function according to some embodiments.

Consider security activation for a UE belonging to a 5GLAN group. FIG. 10 shows the security activation for one UE based on the GUPSP according to some embodiments. The overall flow is based on the PDU Session establishment procedure described in detail in TS 23.502 v15.4.1. At one point in the establishment procedure, the SMF determines the UP Security Policy for the session being setup. Some embodiments introduce the concept of GUPSP which is used to determine the session security policy. One example is that this GUPSP information is retrieved from the UDM as illustrated in FIG. 10 (step 5). Another example could be that the GUPSP is retrieved from an entity in the DN with which this session is established. As illustrated (step 4), a GPSI-to-SUPI translation is made by the UDM but may in another embodiment be made by the SMF itself.

Figure 11A:
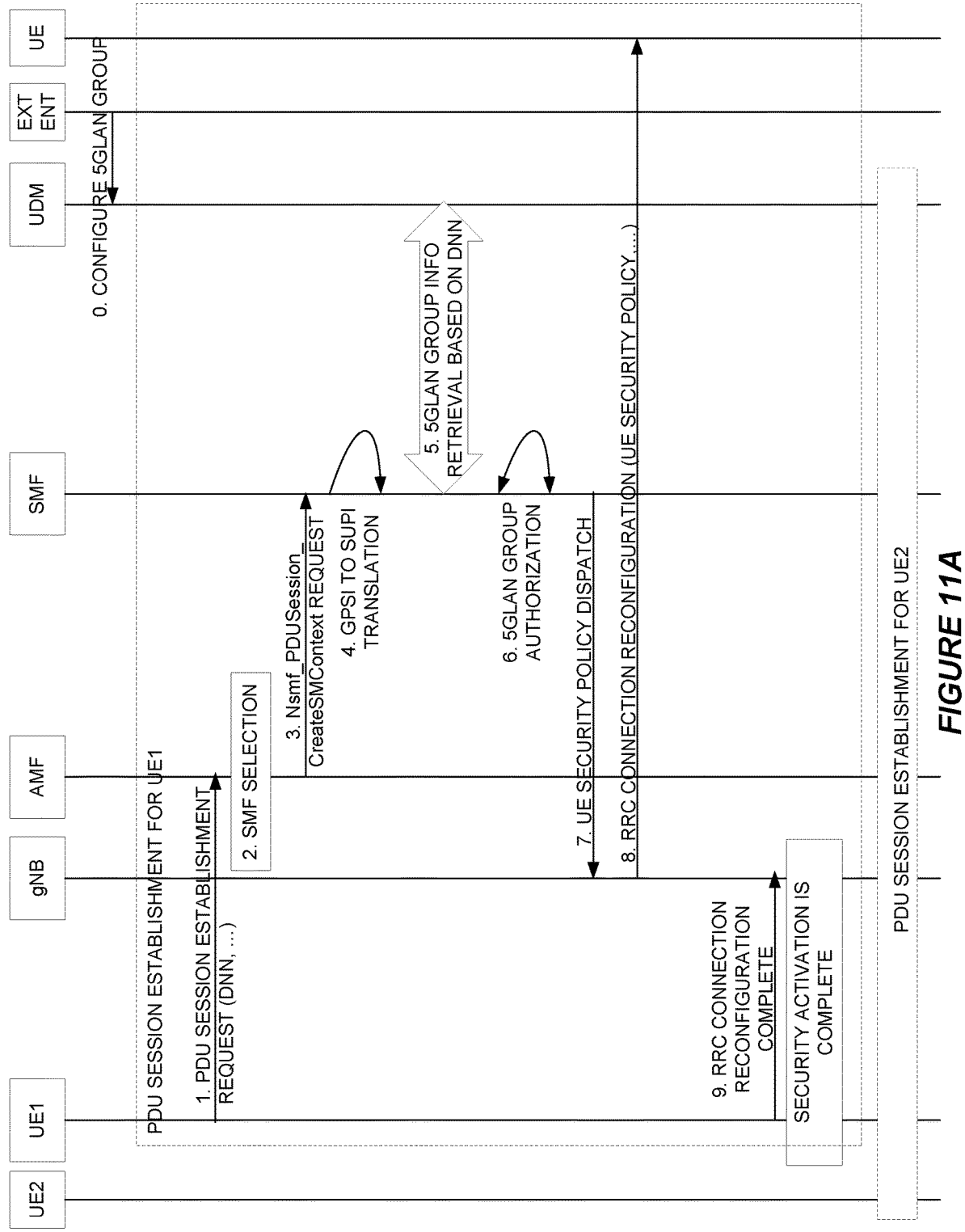
FIGS. 11A-11B are call flow diagrams for securing the user plane paths for different user equipments according to some embodiments.
Figure 11B:
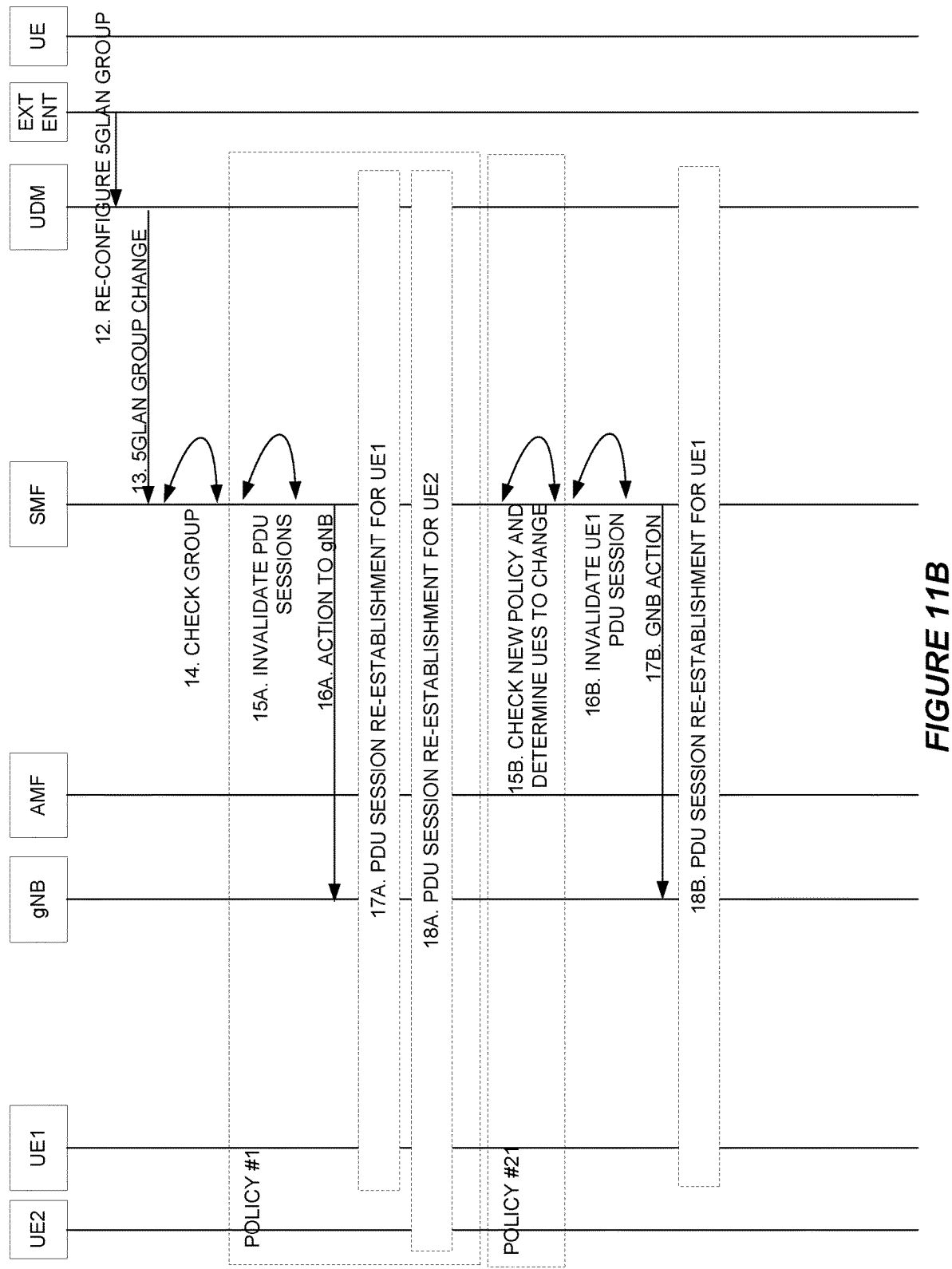

FIGS. 11A-11B show the first steps for UE1 as in FIG. 10, in addition to the re-configuration of the 5GLAN procedure and some alternative actions based on the different said embodiments. Again, the illustrated GPSI-to-SUPI translation (step 4) is in one embodiment made by the UDM and in another embodiment made by the SMF.

Figure 12:
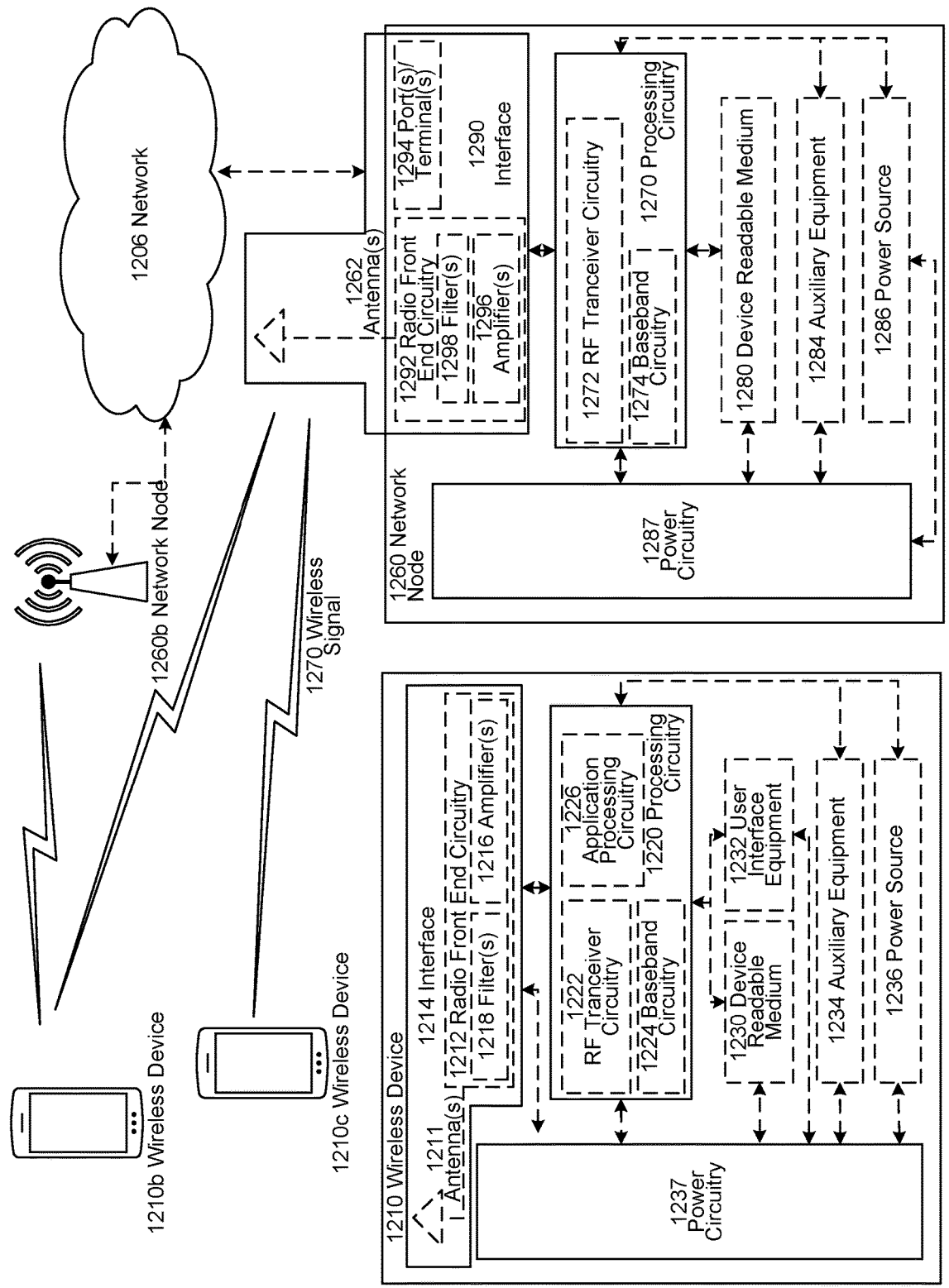
FIG. 12 is a block diagram of a wireless communication network according to some embodiments.

Although the subject matter described herein may be implemented in any appropriate type of system using any suitable components, the embodiments disclosed herein are described in relation to a wireless network, such as the example wireless network illustrated in FIG. 12. For simplicity, the wireless network of FIG. 12 only depicts network 1206, network nodes 1260 and 1260b, and WDs 1210, 1210b, and 1210c. In practice, a wireless network may further include any additional elements suitable to support communication between wireless devices or between a wireless device and another communication device, such as a landline telephone, a service provider, or any other network node or end device. Of the illustrated components, network node 1260 and wireless device (VVD) 1210 are depicted with additional detail. The wireless network may provide communication and other types of services to one or more wireless devices to facilitate the wireless devices' access to and/or use of the services provided by, or via, the wireless network.

The wireless network may comprise and/or interface with any type of communication, telecommunication, data, cellular, and/or radio network or other similar type of system. In some embodiments, the wireless network may be configured to operate according to specific standards or other types of predefined rules or procedures. Thus, particular embodiments of the wireless network may implement communication standards, such as Global System for Mobile Communications (GSM), Universal Mobile Telecommunications System (UMTS), Long Term Evolution (LTE), Narrowband Internet of Things (NB-IoT), and/or other suitable 2G, 3G, 4G, or 5G standards; wireless local area network (WLAN) standards, such as the IEEE 802.11 standards; and/or any other appropriate wireless communication standard, such as the Worldwide Interoperability for Microwave Access (WiMax), Bluetooth, Z-Wave and/or ZigBee standards.

Network 1206 may comprise one or more backhaul networks, core networks, IP networks, public switched telephone networks (PSTNs), packet data networks, optical networks, wide-area networks (WANs), local area networks (LANs), wireless local area networks (WLANs), wired networks, wireless networks, metropolitan area networks, and other networks to enable communication between devices.

Network node 1260 and WD 1210 comprise various components described in more detail below. These components work together in order to provide network node and/or wireless device functionality, such as providing wireless connections in a wireless network. In different embodiments, the wireless network may comprise any number of wired or wireless networks, network nodes, base stations, controllers, wireless devices, relay stations, and/or any other components or systems that may facilitate or participate in the communication of data and/or signals whether via wired or wireless connections.

As used herein, network node refers to equipment capable, configured, arranged and/or operable to communicate directly or indirectly with a wireless device and/or with other network nodes or equipment in the wireless network to enable and/or provide wireless access to the wireless device and/or to perform other functions (e.g., administration) in the wireless network. Examples of network nodes include, but are not limited to, access points (APs) (e.g., radio access points), base stations (BSs) (e.g., radio base stations, Node Bs, evolved Node Bs (eNBs) and NR NodeBs (gNBs)). Base stations may be categorized based on the amount of coverage they provide (or, stated differently, their transmit power level) and may then also be referred to as femto base stations, pico base stations, micro base stations, or macro base stations. A base station may be a relay node or a relay donor node controlling a relay. A network node may also include one or more (or all) parts of a distributed radio base station such as centralized digital units and/or remote radio units (RRUs), sometimes referred to as Remote Radio Heads (RRHs). Such remote radio units may or may not be integrated with an antenna as an antenna integrated radio. Parts of a distributed radio base station may also be referred to as nodes in a distributed antenna system (DAS). Yet further examples of network nodes include multi-standard radio (MSR) equipment such as MSR BSs, network controllers such as radio network controllers (RNCs) or base station controllers (BSCs), base transceiver stations (BTSs), transmission points, transmission nodes, multi-cell/multi-cast coordination entities (MCEs), core network nodes (e.g., MSCs, MM Es), O&M nodes, OSS nodes, SON nodes, positioning nodes (e.g., E-SMLCs), and/or MDTs. More generally, however, network nodes may represent any suitable device (or group of devices) capable, configured, arranged, and/or operable to enable and/or provide a wireless device with access to the wireless network or to provide some service to a wireless device that has accessed the wireless network.

In FIG. 12, network node 1260 includes processing circuitry 1270, device readable medium 1280, interface 1290, auxiliary equipment 1284, power source 1286, power circuitry 1287, and antenna 1262. Although network node 1260 illustrated in the example wireless network of FIG. 12 may represent a device that includes the illustrated combination of hardware components, other embodiments may comprise network nodes with different combinations of components. It is to be understood that a network node comprises any suitable combination of hardware and/or software needed to perform the tasks, features, functions and methods disclosed herein. Moreover, while the components of network node 1260 are depicted as single boxes located within a larger box, or nested within multiple boxes, in practice, a network node may comprise multiple different physical components that make up a single illustrated component (e.g., device readable medium 1280 may comprise multiple separate hard drives as well as multiple RAM modules).

Similarly, network node 1260 may be composed of multiple physically separate components (e.g., a NodeB component and a RNC component, or a BTS component and a BSC component, etc.), which may each have their own respective components. In certain scenarios in which network node 1260 comprises multiple separate components (e.g., BTS and BSC components), one or more of the separate components may be shared among several network nodes. For example, a single RNC may control multiple NodeB's. In such a scenario, each unique NodeB and RNC pair, may in some instances be considered a single separate network node. In some embodiments, network node 1260 may be configured to support multiple radio access technologies (RATs). In such embodiments, some components may be duplicated (e.g., separate device readable medium 1280 for the different RATs) and some components may be reused (e.g., the same antenna 1262 may be shared by the RATs). Network node 1260 may also include multiple sets of the various illustrated components for different wireless technologies integrated into network node 1260, such as, for example, GSM, WCDMA, LTE, NR, WiFi, or Bluetooth wireless technologies. These wireless technologies may be integrated into the same or different chip or set of chips and other components within network node 1260.

Processing circuitry 1270 is configured to perform any determining, calculating, or similar operations (e.g., certain obtaining operations) described herein as being provided by a network node. These operations performed by processing circuitry 1270 may include processing information obtained by processing circuitry 1270 by, for example, converting the obtained information into other information, comparing the obtained information or converted information to information stored in the network node, and/or performing one or more operations based on the obtained information or converted information, and as a result of said processing making a determination.

Processing circuitry 1270 may comprise a combination of one or more of a microprocessor, controller, microcontroller, central processing unit, digital signal processor, application-specific integrated circuit, field programmable gate array, or any other suitable computing device, resource, or combination of hardware, software and/or encoded logic operable to provide, either alone or in conjunction with other network node 1260 components, such as device readable medium 1280, network node 1260 functionality. For example, processing circuitry 1270 may execute instructions stored in device readable medium 1280 or in memory within processing circuitry 1270. Such functionality may include providing any of the various wireless features, functions, or benefits discussed herein. In some embodiments, processing circuitry 1270 may include a system on a chip (SOC).

In some embodiments, processing circuitry 1270 may include one or more of radio frequency (RF) transceiver circuitry 1272 and baseband processing circuitry 1274. In some embodiments, radio frequency (RF) transceiver circuitry 1272 and baseband processing circuitry 1274 may be on separate chips (or sets of chips), boards, or units, such as radio units and digital units. In alternative embodiments, part or all of RF transceiver circuitry 1272 and baseband processing circuitry 1274 may be on the same chip or set of chips, boards, or units In certain embodiments, some or all of the functionality described herein as being provided by a network node, base station, eNB or other such network device may be performed by processing circuitry 1270 executing instructions stored on device readable medium 1280 or memory within processing circuitry 1270. In alternative embodiments, some or all of the functionality may be provided by processing circuitry 1270 without executing instructions stored on a separate or discrete device readable medium, such as in a hard-wired manner. In any of those embodiments, whether executing instructions stored on a device readable storage medium or not, processing circuitry 1270 can be configured to perform the described functionality. The benefits provided by such functionality are not limited to processing circuitry 1270 alone or to other components of network node 1260, but are enjoyed by network node 1260 as a whole, and/or by end users and the wireless network generally.

Device readable medium 1280 may comprise any form of volatile or non-volatile computer readable memory including, without limitation, persistent storage, solid-state memory, remotely mounted memory, magnetic media, optical media, random access memory (RAM), read-only memory (ROM), mass storage media (for example, a hard disk), removable storage media (for example, a flash drive, a Compact Disk (CD) or a Digital Video Disk (DVD)), and/or any other volatile or non-volatile, non-transitory device readable and/or computer-executable memory devices that store information, data, and/or instructions that may be used by processing circuitry 1270. Device readable medium 1280 may store any suitable instructions, data or information, including a computer program, software, an application including one or more of logic, rules, code, tables, etc. and/or other instructions capable of being executed by processing circuitry 1270 and, utilized by network node 1260. Device readable medium 1280 may be used to store any calculations made by processing circuitry 1270 and/or any data received via interface 1290. In some embodiments, processing circuitry 1270 and device readable medium 1280 may be considered to be integrated.

Interface 1290 is used in the wired or wireless communication of signalling and/or data between network node 1260, network 1206, and/or WDs 1210. As illustrated, interface 1290 comprises port(s)/terminal(s) 1294 to send and receive data, for example to and from network 1206 over a wired connection. Interface 1290 also includes radio front end circuitry 1292 that may be coupled to, or in certain embodiments a part of, antenna 1262. Radio front end circuitry 1292 comprises filters 1298 and amplifiers 1296. Radio front end circuitry 1292 may be connected to antenna 1262 and processing circuitry 1270. Radio front end circuitry may be configured to condition signals communicated between antenna 1262 and processing circuitry 1270. Radio front end circuitry 1292 may receive digital data that is to be sent out to other network nodes or WDs via a wireless connection. Radio front end circuitry 1292 may convert the digital data into a radio signal having the appropriate channel and bandwidth parameters using a combination of filters 1298 and/or amplifiers 1296. The radio signal may then be transmitted via antenna 1262. Similarly, when receiving data, antenna 1262 may collect radio signals which are then converted into digital data by radio front end circuitry 1292. The digital data may be passed to processing circuitry 1270. In other embodiments, the interface may comprise different components and/or different combinations of components.

In certain alternative embodiments, network node 1260 may not include separate radio front end circuitry 1292, instead, processing circuitry 1270 may comprise radio front end circuitry and may be connected to antenna 1262 without separate radio front end circuitry 1292. Similarly, in some embodiments, all or some of RF transceiver circuitry 1272 may be considered a part of interface 1290. In still other embodiments, interface 1290 may include one or more ports or terminals 1294, radio front end circuitry 1292, and RF transceiver circuitry 1272, as part of a radio unit (not shown), and interface 1290 may communicate with baseband processing circuitry 1274, which is part of a digital unit (not shown).

Antenna 1262 may include one or more antennas, or antenna arrays, configured to send and/or receive wireless signals. Antenna 1262 may be coupled to radio front end circuitry 1290 and may be any type of antenna capable of transmitting and receiving data and/or signals wirelessly. In some embodiments, antenna 1262 may comprise one or more omni-directional, sector or panel antennas operable to transmit/receive radio signals between, for example, 2 GHz and 66 GHz. An omni-directional antenna may be used to transmit/receive radio signals in any direction, a sector antenna may be used to transmit/receive radio signals from devices within a particular area, and a panel antenna may be a line of sight antenna used to transmit/receive radio signals in a relatively straight line. In some instances, the use of more than one antenna may be referred to as MIMO. In certain embodiments, antenna 1262 may be separate from network node 1260 and may be connectable to network node 1260 through an interface or port.

Antenna 1262, interface 1290, and/or processing circuitry 1270 may be configured to perform any receiving operations and/or certain obtaining operations described herein as being performed by a network node. Any information, data and/or signals may be received from a wireless device, another network node and/or any other network equipment. Similarly, antenna 1262, interface 1290, and/or processing circuitry 1270 may be configured to perform any transmitting operations described herein as being performed by a network node. Any information, data and/or signals may be transmitted to a wireless device, another network node and/or any other network equipment.

Power circuitry 1287 may comprise, or be coupled to, power management circuitry and is configured to supply the components of network node 1260 with power for performing the functionality described herein. Power circuitry 1287 may receive power from power source 1286. Power source 1286 and/or power circuitry 1287 may be configured to provide power to the various components of network node 1260 in a form suitable for the respective components (e.g., at a voltage and current level needed for each respective component). Power source 1286 may either be included in, or external to, power circuitry 1287 and/or network node 1260. For example, network node 1260 may be connectable to an external power source (e.g., an electricity outlet) via an input circuitry or interface such as an electrical cable, whereby the external power source supplies power to power circuitry 1287. As a further example, power source 1286 may comprise a source of power in the form of a battery or battery pack which is connected to, or integrated in, power circuitry 1287. The battery may provide backup power should the external power source fail. Other types of power sources, such as photovoltaic devices, may also be used.

Alternative embodiments of network node 1260 may include additional components beyond those shown in FIG. 12 that may be responsible for providing certain aspects of the network node's functionality, including any of the functionality described herein and/or any functionality necessary to support the subject matter described herein. For example, network node 1260 may include user interface equipment to allow input of information into network node 1260 and to allow output of information from network node 1260. This may allow a user to perform diagnostic, maintenance, repair, and other administrative functions for network node 1260.

As used herein, wireless device (VVD) refers to a device capable, configured, arranged and/or operable to communicate wirelessly with network nodes and/or other wireless devices. Unless otherwise noted, the term WD may be used interchangeably herein with user equipment (UE). Communicating wirelessly may involve transmitting and/or receiving wireless signals using electromagnetic waves, radio waves, infrared waves, and/or other types of signals suitable for conveying information through air. In some embodiments, a WD may be configured to transmit and/or receive information without direct human interaction. For instance, a WD may be designed to transmit information to a network on a predetermined schedule, when triggered by an internal or external event, or in response to requests from the network. Examples of a WD include, but are not limited to, a smart phone, a mobile phone, a cell phone, a voice over IP (VoIP) phone, a wireless local loop phone, a desktop computer, a personal digital assistant (PDA), a wireless cameras, a gaming console or device, a music storage device, a playback appliance, a wearable terminal device, a wireless endpoint, a mobile station, a tablet, a laptop, a laptopembedded equipment (LEE), a laptop-mounted equipment (LME), a smart device, a wireless customer-premise equipment (CPE). a vehicle-mounted wireless terminal device, etc. A WD may support device-to-device (D2D) communication, for example by implementing a 3GPP standard for sidelink communication, vehicle-to-vehicle (V2V), vehicle-to-infrastructure (V2I), vehicle-to-everything (V2X) and may in this case be referred to as a D2D communication device. As yet another specific example, in an Internet of Things (IoT) scenario, a WD may represent a machine or other device that performs monitoring and/or measurements, and transmits the results of such monitoring and/or measurements to another WD and/or a network node. The WD may in this case be a machine-to-machine (M2M) device, which may in a 3GPP context be referred to as an MTC device. As one particular example, the WD may be a UE implementing the 3GPP narrow band internet of things (NB-IoT) standard. Particular examples of such machines or devices are sensors, metering devices such as power meters, industrial machinery, or home or personal appliances (e.g. refrigerators, televisions, etc.) personal wearables (e.g., watches, fitness trackers, etc.). In other scenarios, a WD may represent a vehicle or other equipment that is capable of monitoring and/or reporting on its operational status or other functions associated with its operation. A WD as described above may represent the endpoint of a wireless connection, in which case the device may be referred to as a wireless terminal. Furthermore, a WD as described above may be mobile, in which case it may also be referred to as a mobile device or a mobile terminal.

As illustrated, wireless device 1210 includes antenna 1211, interface 1214, processing circuitry 1220, device readable medium 1230, user interface equipment 1232, auxiliary equipment 1234, power source 1236 and power circuitry 1237. WD 1210 may include multiple sets of one or more of the illustrated components for different wireless technologies supported by WD 1210, such as, for example, GSM, WCDMA, LTE, NR, WiFi, WiMAX, NB-IoT, or Bluetooth wireless technologies, just to mention a few. These wireless technologies may be integrated into the same or different chips or set of chips as other components within WD 1210.

Antenna 1211 may include one or more antennas or antenna arrays, configured to send and/or receive wireless signals, and is connected to interface 1214. In certain alternative embodiments, antenna 1211 may be separate from WD 1210 and be connectable to WD 1210 through an interface or port. Antenna 1211, interface 1214, and/or processing circuitry 1220 may be configured to perform any receiving or transmitting operations described herein as being performed by a WD. Any information, data and/or signals may be received from a network node and/or another WD. In some embodiments, radio front end circuitry and/or antenna 1211 may be considered an interface.

As illustrated, interface 1214 comprises radio front end circuitry 1212 and antenna 1211. Radio front end circuitry 1212 comprise one or more filters 1218 and amplifiers 1216. Radio front end circuitry 1214 is connected to antenna 1211 and processing circuitry 1220, and is configured to condition signals communicated between antenna 1211 and processing circuitry 1220. Radio front end circuitry 1212 may be coupled to or a part of antenna 1211. In some embodiments, WD 1210 may not include separate radio front end circuitry 1212; rather, processing circuitry 1220 may comprise radio front end circuitry and may be connected to antenna 1211. Similarly, in some embodiments, some or all of RF transceiver circuitry 1222 may be considered a part of interface 1214. Radio front end circuitry 1212 may receive digital data that is to be sent out to other network nodes or WDs via a wireless connection. Radio front end circuitry 1212 may convert the digital data into a radio signal having the appropriate channel and bandwidth parameters using a combination of filters 1218 and/or amplifiers 1216. The radio signal may then be transmitted via antenna 1211. Similarly, when receiving data, antenna 1211 may collect radio signals which are then converted into digital data by radio front end circuitry 1212. The digital data may be passed to processing circuitry 1220. In other embodiments, the interface may comprise different components and/or different combinations of components.

Processing circuitry 1220 may comprise a combination of one or more of a microprocessor, controller, microcontroller, central processing unit, digital signal processor, application-specific integrated circuit, field programmable gate array, or any other suitable computing device, resource, or combination of hardware, software, and/or encoded logic operable to provide, either alone or in conjunction with other WD 1210 components, such as device readable medium 1230, WD 1210 functionality. Such functionality may include providing any of the various wireless features or benefits discussed herein. For example, processing circuitry 1220 may execute instructions stored in device readable medium 1230 or in memory within processing circuitry 1220 to provide the functionality disclosed herein.

As illustrated, processing circuitry 1220 includes one or more of RF transceiver circuitry 1222, baseband processing circuitry 1224, and application processing circuitry 1226. In other embodiments, the processing circuitry may comprise different components and/or different combinations of components. In certain embodiments processing circuitry 1220 of WD 1210 may comprise a SOC. In some embodiments, RF transceiver circuitry 1222, baseband processing circuitry 1224, and application processing circuitry 1226 may be on separate chips or sets of chips. In alternative embodiments, part or all of baseband processing circuitry 1224 and application processing circuitry 1226 may be combined into one chip or set of chips, and RF transceiver circuitry 1222 may be on a separate chip or set of chips. In still alternative embodiments, part or all of RF transceiver circuitry 1222 and baseband processing circuitry 1224 may be on the same chip or set of chips, and application processing circuitry 1226 may be on a separate chip or set of chips. In yet other alternative embodiments, part or all of RF transceiver circuitry 1222, baseband processing circuitry 1224, and application processing circuitry 1226 may be combined in the same chip or set of chips. In some embodiments, RF transceiver circuitry 1222 may be a part of interface 1214. RF transceiver circuitry 1222 may condition RF signals for processing circuitry 1220.

In certain embodiments, some or all of the functionality described herein as being performed by a WD may be provided by processing circuitry 1220 executing instructions stored on device readable medium 1230, which in certain embodiments may be a computer-readable storage medium. In alternative embodiments, some or all of the functionality may be provided by processing circuitry 1220 without executing instructions stored on a separate or discrete device readable storage medium, such as in a hard-wired manner. In any of those particular embodiments, whether executing instructions stored on a device readable storage medium or not, processing circuitry 1220 can be configured to perform the described functionality. The benefits provided by such functionality are not limited to processing circuitry 1220 alone or to other components of WD 1210, but are enjoyed by WD 1210 as a whole, and/or by end users and the wireless network generally.

Processing circuitry 1220 may be configured to perform any determining, calculating, or similar operations (e.g., certain obtaining operations) described herein as being performed by a WD. These operations, as performed by processing circuitry 1220, may include processing information obtained by processing circuitry 1220 by, for example, converting the obtained information into other information, comparing the obtained information or converted information to information stored by WD 1210, and/or performing one or more operations based on the obtained information or converted information, and as a result of said processing making a determination.

Device readable medium 1230 may be operable to store a computer program, software, an application including one or more of logic, rules, code, tables, etc. and/or other instructions capable of being executed by processing circuitry 1220. Device readable medium 1230 may include computer memory (e.g., Random Access Memory (RAM) or Read Only Memory (ROM)), mass storage media (e.g., a hard disk), removable storage media (e.g., a Compact Disk (CD) or a Digital Video Disk (DVD)), and/or any other volatile or non-volatile, non-transitory device readable and/or computer executable memory devices that store information, data, and/or instructions that may be used by processing circuitry 1220. In some embodiments, processing circuitry 1220 and device readable medium 1230 may be considered to be integrated.

User interface equipment 1232 may provide components that allow for a human user to interact with WD 1210. Such interaction may be of many forms, such as visual, audial, tactile, etc. User interface equipment 1232 may be operable to produce output to the user and to allow the user to provide input to WD 1210. The type of interaction may vary depending on the type of user interface equipment 1232 installed in WD 1210. For example, if WD 1210 is a smart phone, the interaction may be via a touch screen; if WD 1210 is a smart meter, the interaction may be through a screen that provides usage (e.g., the number of gallons used) or a speaker that provides an audible alert (e.g., if smoke is detected). User interface equipment 1232 may include input interfaces, devices and circuits, and output interfaces, devices and circuits. User interface equipment 1232 is configured to allow input of information into WD 1210, and is connected to processing circuitry 1220 to allow processing circuitry 1220 to process the input information. User interface equipment 1232 may include, for example, a microphone, a proximity or other sensor, keys/buttons, a touch display, one or more cameras, a USB port, or other input circuitry. User interface equipment 1232 is also configured to allow output of information from WD 1210, and to allow processing circuitry 1220 to output information from WD 1210. User interface equipment 1232 may include, for example, a speaker, a display, vibrating circuitry, a USB port, a headphone interface, or other output circuitry. Using one or more input and output interfaces, devices, and circuits, of user interface equipment 1232, WD 1210 may communicate with end users and/or the wireless network, and allow them to benefit from the functionality described herein.

Auxiliary equipment 1234 is operable to provide more specific functionality which may not be generally performed by WDs. This may comprise specialized sensors for doing measurements for various purposes, interfaces for additional types of communication such as wired communications etc. The inclusion and type of components of auxiliary equipment 1234 may vary depending on the embodiment and/or scenario.

Power source 1236 may, in some embodiments, be in the form of a battery or battery pack. Other types of power sources, such as an external power source (e.g., an electricity outlet), photovoltaic devices or power cells, may also be used. WD 1210 may further comprise power circuitry 1237 for delivering power from power source 1236 to the various parts of WD 1210 which need power from power source 1236 to carry out any functionality described or indicated herein. Power circuitry 1237 may in certain embodiments comprise power management circuitry. Power circuitry 1237 may additionally or alternatively be operable to receive power from an external power source; in which case WD 1210 may be connectable to the external power source (such as an electricity outlet) via input circuitry or an interface such as an electrical power cable. Power circuitry 1237 may also in certain embodiments be operable to deliver power from an external power source to power source 1236. This may be, for example, for the charging of power source 1236. Power circuitry 1237 may perform any formatting, converting, or other modification to the power from power source 1236 to make the power suitable for the respective components of WD 1210 to which power is supplied.

Figure 13:
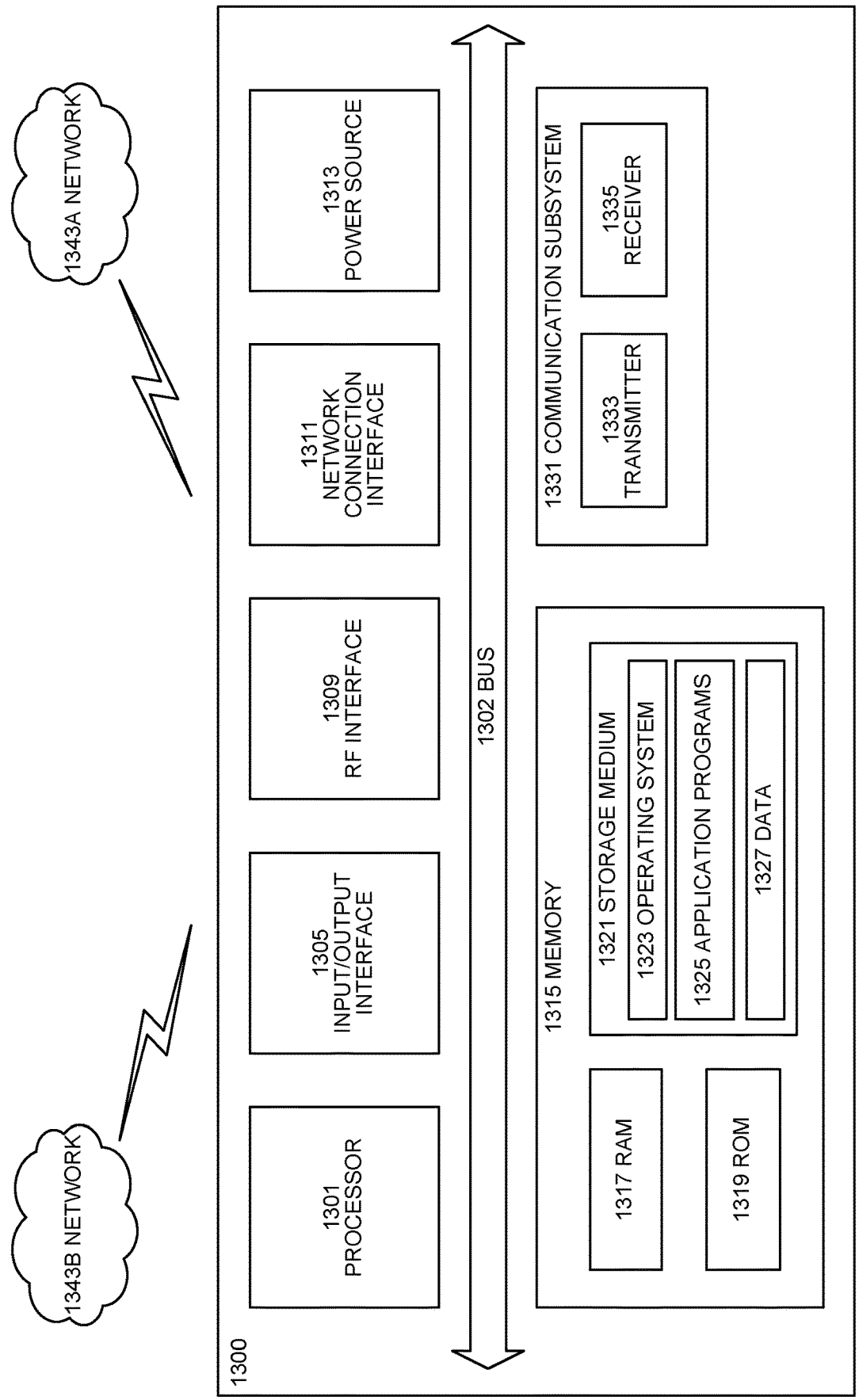
FIG. 13 is a block diagram of a user equipment according to some embodiments.

FIG. 13 illustrates one embodiment of a UE in accordance with various aspects described herein. As used herein, a user equipment or UE may not necessarily have a user in the sense of a human user who owns and/or operates the relevant device. Instead, a UE may represent a device that is intended for sale to, or operation by, a human user but which may not, or which may not initially, be associated with a specific human user (e.g., a smart sprinkler controller). Alternatively, a UE may represent a device that is not intended for sale to, or operation by, an end user but which may be associated with or operated for the benefit of a user (e.g., a smart power meter). UE 13200 may be any UE identified by the $3^{rd}$ Generation Partnership Project (3GPP), including a NB-IoT UE, a machine type communication (MTC) UE, and/or an enhanced MTC (eMTC) UE. UE 1300, as illustrated in FIG. 13, is one example of a WD configured for communication in accordance with one or more communication standards promulgated by the $3^{rd}$ Generation Partnership Project (3GPP), such as 3GPP's GSM, UMTS, LTE, and/or 5G standards. As mentioned previously, the term WD and UE may be used interchangeable. Accordingly, although FIG. 13 is a UE, the components discussed herein are equally applicable to a WD, and vice-versa.

In FIG. 13, UE 1300 includes processing circuitry 1301 that is operatively coupled to input/output interface 1305, radio frequency (RF) interface 1309, network connection interface 1311, memory 1315 including random access memory (RAM) 1317, read-only memory (ROM) 1319, and storage medium 1321 or the like, communication subsystem 1331, power source 1333, and/or any other component, or any combination thereof. Storage medium 1321 includes operating system 1323, application program 1325, and data 1327. In other embodiments, storage medium 1321 may include other similar types of information. Certain UEs may utilize all of the components shown in FIG. 13, or only a subset of the components. The level of integration between the components may vary from one UE to another UE. Further, certain UEs may contain multiple instances of a component, such as multiple processors, memories, transceivers, transmitters, receivers, etc.

In FIG. 13, processing circuitry 1301 may be configured to process computer instructions and data. Processing circuitry 1301 may be configured to implement any sequential state machine operative to execute machine instructions stored as machine-readable computer programs in the memory, such as one or more hardware-implemented state machines (e.g., in discrete logic, FPGA, ASIC, etc.); programmable logic together with appropriate firmware; one or more stored program, general-purpose processors, such as a microprocessor or Digital Signal Processor (DSP), together with appropriate software; or any combination of the above. For example, the processing circuitry 1301 may include two central processing units (CPUs). Data may be information in a form suitable for use by a computer.

In the depicted embodiment, input/output interface 1305 may be configured to provide a communication interface to an input device, output device, or input and output device. UE 1300 may be configured to use an output device via input/output interface 1305. An output device may use the same type of interface port as an input device. For example, a USB port may be used to provide input to and output from UE 1300. The output device may be a speaker, a sound card, a video card, a display, a monitor, a printer, an actuator, an emitter, a smartcard, another output device, or any combination thereof. UE 1300 may be configured to use an input device via input/output interface 1305 to allow a user to capture information into UE 1300. The input device may include a touch-sensitive or presence-sensitive display, a camera (e.g., a digital camera, a digital video camera, a web camera, etc.), a microphone, a sensor, a mouse, a trackball, a directional pad, a trackpad, a scroll wheel, a smartcard, and the like. The presence-sensitive display may include a capacitive or resistive touch sensor to sense input from a user. A sensor may be, for instance, an accelerometer, a gyroscope, a tilt sensor, a force sensor, a magnetometer, an optical sensor, a proximity sensor, another like sensor, or any combination thereof. For example, the input device may be an accelerometer, a magnetometer, a digital camera, a microphone, and an optical sensor.

In FIG. 13, RF interface 1309 may be configured to provide a communication interface to RF components such as a transmitter, a receiver, and an antenna. Network connection interface 1311 may be configured to provide a communication interface to network 1343*a*. Network 1343*a* may encompass wired and/or wireless networks such as a local-area network (LAN), a wide-area network (WAN), a computer network, a wireless network, a telecommunications network, another like network or any combination thereof. For example, network 1343*a* may comprise a Wi-Fi network. Network connection interface 1311 may be configured to include a receiver and a transmitter interface used to communicate with one or more other devices over a communication network according to one or more communication protocols, such as Ethernet, TCP/IP, SONET, ATM, or the like. Network connection interface 1311 may implement receiver and transmitter functionality appropriate to the communication network links (e.g., optical, electrical, and the like). The transmitter and receiver functions may share circuit components, software or firmware, or alternatively may be implemented separately.

RAM 1317 may be configured to interface via bus 1302 to processing circuitry 1301 to provide storage or caching of data or computer instructions during the execution of software programs such as the operating system, application programs, and device drivers. ROM 1319 may be configured to provide computer instructions or data to processing circuitry 1301. For example, ROM 1319 may be configured to store invariant low-level system code or data for basic system functions such as basic input and output (I/O), startup, or reception of keystrokes from a keyboard that are stored in a non-volatile memory. Storage medium 1321 may be configured to include memory such as RAM, ROM, programmable read-only memory (PROM), erasable programmable read-only memory (EPROM), electrically erasable programmable read-only memory (EEPROM), magnetic disks, optical disks, floppy disks, hard disks, removable cartridges, or flash drives. In one example, storage medium 1321 may be configured to include operating system 1323, application program 1325 such as a web browser application, a widget or gadget engine or another application, and data file 1327. Storage medium 1321 may store, for use by UE 1300, any of a variety of various operating systems or combinations of operating systems.

Storage medium 1321 may be configured to include a number of physical drive units, such as redundant array of independent disks (RAID), floppy disk drive, flash memory, USB flash drive, external hard disk drive, thumb drive, pen drive, key drive, high-density digital versatile disc (HD-DVD) optical disc drive, internal hard disk drive, Blu-Ray optical disc drive, holographic digital data storage (HDDS) optical disc drive, external mini-dual in-line memory module (DIMM), synchronous dynamic random access memory (SDRAM), external micro-DIMM SDRAM, smartcard memory such as a subscriber identity module or a removable user identity (SIM/RUIM) module, other memory, or any combination thereof. Storage medium 1321 may allow UE 1300 to access computer-executable instructions, application programs or the like, stored on transitory or non-transitory memory media, to off-load data, or to upload data. An article of manufacture, such as one utilizing a communication system may be tangibly embodied in storage medium 1321, which may comprise a device readable medium.

In FIG. 13, processing circuitry 1301 may be configured to communicate with network 1343*b* using communication subsystem 1331. Network 1343*a* and network 1343*b* may be the same network or networks or different network or networks. Communication subsystem 1331 may be configured to include one or more transceivers used to communicate with network 1343*b*. For example, communication subsystem 1331 may be configured to include one or more transceivers used to communicate with one or more remote transceivers of another device capable of wireless communication such as another WD, UE, or base station of a radio access network (RAN) according to one or more communication protocols, such as IEEE 802.13, CDMA, WCDMA, GSM, LTE, UTRAN, WiMax, or the like. Each transceiver may include transmitter 1333 and/or receiver 1335 to implement transmitter or receiver functionality, respectively, appropriate to the RAN links (e.g., frequency allocations and the like). Further, transmitter 1333 and receiver 1335 of each transceiver may share circuit components, software or firmware, or alternatively may be implemented separately.

In the illustrated embodiment, the communication functions of communication subsystem 1331 may include data communication, voice communication, multimedia communication, short-range communications such as Bluetooth, near-field communication, location-based communication such as the use of the global positioning system (GPS) to determine a location, another like communication function, or any combination thereof. For example, communication subsystem 1331 may include cellular communication, Wi-Fi communication, Bluetooth communication, and GPS communication. Network 1343*b* may encompass wired and/or wireless networks such as a local-area network (LAN), a wide-area network (WAN), a computer network, a wireless network, a telecommunications network, another like network or any combination thereof. For example, network 1343b may be a cellular network, a Wi-Fi network, and/or a near-field network. Power source 1313 may be configured to provide alternating current (AC) or direct current (DC) power to components of UE 1300.

The features, benefits and/or functions described herein may be implemented in one of the components of UE 1300 or partitioned across multiple components of UE 1300. Further, the features, benefits, and/or functions described herein may be implemented in any combination of hardware, software or firmware. In one example, communication subsystem 1331 may be configured to include any of the components described herein. Further, processing circuitry 1301 may be configured to communicate with any of such components over bus 1302. In another example, any of such components may be represented by program instructions stored in memory that when executed by processing circuitry 1301 perform the corresponding functions described herein. In another example, the functionality of any of such components may be partitioned between processing circuitry 1301 and communication subsystem 1331. In another example, the non-computationally intensive functions of any of such components may be implemented in software or firmware and the computationally intensive functions may be implemented in hardware.

Any appropriate steps, methods, features, functions, or benefits disclosed herein may be performed through one or more functional units or modules of one or more virtual apparatuses. Each virtual apparatus may comprise a number of these functional units. These functional units may be implemented via processing circuitry, which may include one or more microprocessor or microcontrollers, as well as other digital hardware, which may include digital signal processors (DSPs), special-purpose digital logic, and the like. The processing circuitry may be configured to execute program code stored in memory, which may include one or several types of memory such as read-only memory (ROM), random-access memory (RAM), cache memory, flash memory devices, optical storage devices, etc. Program code stored in memory includes program instructions for executing one or more telecommunications and/or data communications protocols as well as instructions for carrying out one or more of the techniques described herein. In some implementations, the processing circuitry may be used to cause the respective functional unit to perform corresponding functions according one or more embodiments of the present disclosure.

Generally, all terms used herein are to be interpreted according to their ordinary meaning in the relevant technical field, unless a different meaning is clearly given and/or is implied from the context in which it is used. All references to a/an/the element, apparatus, component, means, step, etc. are to be interpreted openly as referring to at least one instance of the element, apparatus, component, means, step, etc., unless explicitly stated otherwise. The steps of any methods disclosed herein do not have to be performed in the exact order disclosed, unless a step is explicitly described as following or preceding another step and/or where it is implicit that a step must follow or precede another step. Any feature of any of the embodiments disclosed herein may be applied to any other embodiment, wherever appropriate. Likewise, any advantage of any of the embodiments may apply to any other embodiments, and vice versa. Other objectives, features and advantages of the enclosed embodiments will be apparent from the description.

The term unit may have conventional meaning in the field of electronics, electrical devices and/or electronic devices and may include, for example, electrical and/or electronic circuitry, devices, modules, processors, memories, logic solid state and/or discrete devices, computer programs or instructions for carrying out respective tasks, procedures, computations, outputs, and/or displaying functions, and so on, as such as those that are described herein.

Some of the embodiments contemplated herein are described more fully with reference to the accompanying drawings. Other embodiments, however, are contained within the scope of the subject matter disclosed herein. The disclosed subject matter should not be construed as limited to only the embodiments set forth herein; rather, these embodiments are provided by way of example to convey the scope of the subject matter to those skilled in the art.

Example embodiments of the techniques and apparatus described herein include, but are not limited to, the following enumerated examples:

Group A Embodiments

1. A method performed by a network node in a wireless communication network, the method comprising:
   receiving, at the network node, a request to establish a session for a device in a group;
   determining a user plane security policy for securing a user plane path of the session, based on a group user plane security policy specifying a policy for securing user plane paths of any respective sessions for devices in the group; and
   transmitting, from the network node to an access node of the wireless communication network, control signaling indicating the determined user plane security policy.

2. The method of embodiment 1, wherein, according to the group user plane security policy, user plane security policies for securing user plane paths of any respective sessions for devices in the group are to be the same.

3. The method of any of embodiments 1-2, wherein said determining comprises determining the user plane security policy for securing the user plane path of the session to be the same as a user plane security policy for securing the user plane path of a different session for a different device in the group.

4. The method of embodiment 1, wherein, according to the group user plane security policy, user plane paths of any respective sessions for devices in the group are to be secured with a specified minimum level of security.

5. The method of any of embodiments 1-4, wherein the group user plane security policy indicates:
   whether confidentiality protection is required or not needed for securing the user plane paths of any respective sessions for devices in the group; and/or
   whether integrity protection is required or not needed for securing the user plane paths of any respective sessions for devices in the group.

6. The method of any of embodiments 1-4, wherein the group user plane security policy indicates:
   whether confidentiality protection is required, preferred, or not needed for securing the user plane paths of any respective sessions for devices in the group; and/or
   whether integrity protection is required, preferred, or not needed for securing the user plane paths of any respective sessions for devices in the group.

7. The method of any of embodiments 1-6, further comprising obtaining the group user plane security policy from a node implementing an application function, a node in a data network, a node in an operations and support system, OSS, a node implementing a unified data management, UDM, function, or a node implementing a policy control function, PCF.

8. The method of any of embodiments 1-7, further comprising obtaining the group user plane security policy during a procedure for establishing the session.

9. The method of any of embodiments 1-6, further comprising generating the group user plane security policy during a procedure for establishing the session.

10. The method of any of embodiments 1-9, wherein the group is a 5GLAN group.

11. The method of any of embodiments 1-10, wherein the group is a restricted set of devices configured to privately communicate amongst each other via the respective sessions for the devices.

12. The method of any of embodiments 1-11, wherein the request indicates a data network name, DNN, associated with the group.

13. The method of any of embodiments 1-12, wherein the network node implements a session management function, SMF, in a 5G core network.

14. The method of any of embodiments 1-13, wherein the group is a restricted set of devices configured to privately communicate amongst each other via a 5G local area network (LAN) type service.

15. A method performed by a network node in a wireless communication network, the method comprising:
obtaining, at the network node, a group user plane security policy specifying a policy for securing user plane paths of any respective sessions for devices in a group; and
controlling, by the network node, securing of the user plane paths of any respective sessions for the devices in the group according to the group user plane security policy.

16. The method of embodiment 15, wherein said controlling comprises transmitting, from the network node to an access node of the wireless communication network, control signaling indicating a user plane security policy determined for one of the respective sessions from the group user plane security policy.

17. A method performed by a network node in a wireless communication network, the method comprising:
controlling, by the network node, securing of user plane paths of any respective sessions for devices in a group according to the group user plane security policy.

Group B Embodiments

18. A method comprising:
transmitting, to a network node in a wireless communication network, a group user plane security policy specifying a policy for securing user plane paths of any respective sessions for devices in a group.

20. The method of embodiment 18, wherein, according to the group user plane security policy, user plane security policies for securing user plane paths of any respective sessions for devices in the group are to be the same.

21. The method of embodiment 18, wherein, according to the group user plane security policy, user plane paths of any respective sessions for devices in the group are to be secured with a specified minimum level of security.

22. The method of any of embodiments 19-21, wherein the group user plane security policy indicates:
whether confidentiality protection is required or not needed for securing the user plane paths of any respective sessions for devices in the group; and/or
whether integrity protection is required or not needed for securing the user plane paths of any respective sessions for devices in the group.

23. The method of any of embodiments 19-21, wherein the group user plane security policy indicates:
whether confidentiality protection is required, preferred, or not needed for securing the user plane paths of any respective sessions for devices in the group; and/or
whether integrity protection is required, preferred, or not needed for securing the user plane paths of any respective sessions for devices in the group.

24. The method of any of embodiments 19-23, wherein the method is implemented by a node implementing an application function, a node in a data network, a node in an operations and support system, OSS, a node implementing a unified data management, UDM, function, or a node implementing a policy control function, PCF.

25. The method of any of embodiments 19-24, wherein said transmitting is performed during a procedure for establishing the session.

26. The method of any of embodiments 19-25, wherein the group is a 5GLAN group.

27. The method of any of embodiments 19-26, wherein the group is a restricted set of devices configured to privately communicate amongst each other via the respective sessions for the devices.

28. The method of any of embodiments 19-27, wherein the network node implements a session management function, SMF, in a 5G core network.

29. The method of any of embodiments 19-28, wherein the group is a restricted set of devices configured to privately communicate amongst each other via a 5G local area network (LAN) type service.

Group C Embodiments

C1. A network node configured to perform any of the steps of any of the Group A embodiments.

C2. A network node comprising:
processing circuitry configured to perform any of the steps of any of the Group A embodiments; and
power supply circuitry configured to supply power to the network node.

C3. A network node comprising:
processing circuitry and memory, the memory containing instructions executable by the processing circuitry whereby the network node is configured to perform any of the steps of any of the Group A embodiments.

C4. Reserved.

C5. A computer program comprising instructions which, when executed by at least one processor of a network node, causes the network node to carry out the steps of any of the Group A embodiments.

C6. A carrier containing the computer program of embodiment C5, wherein the carrier is one of an electronic signal, optical signal, radio signal, or computer readable storage medium.

C7. A node configured to perform any of the steps of any of the Group B embodiments.

C8. A node comprising:
processing circuitry configured to perform any of the steps of any of the Group B embodiments;
power supply circuitry configured to supply power to the node.

C9. A node comprising:
processing circuitry and memory, the memory containing instructions executable by the processing circuitry whereby the node is configured to perform any of the steps of any of the Group B embodiments.

C10. A computer program comprising instructions which, when executed by at least one processor of a node, causes the node to carry out the steps of any of the Group B embodiments.

C11. A carrier containing the computer program of embodiment 010, wherein the carrier is one of an electronic signal, optical signal, radio signal, or computer readable storage medium.

Abbreviations

At least some of the following abbreviations may be used in this disclosure. If there is an inconsistency between abbreviations, preference should be given to how it is used above. If listed multiple times below, the first listing should be preferred over any subsequent listing(s).

1×RTT CDMA2000 1× Radio Transmission Technology
3GPP 3rd Generation Partnership Project
5G 5th Generation
ABS Almost Blank Subframe
ARQ Automatic Repeat Request
AWGN Additive White Gaussian Noise
BCCH Broadcast Control Channel
BCH Broadcast Channel
CA Carrier Aggregation
CC Carrier Component
CCCH SDU Common Control Channel SDU
CDMA Code Division Multiplexing Access
CGI Cell Global Identifier
CIR Channel Impulse Response
CP Cyclic Prefix
CPICH Common Pilot Channel
CPICH Ec/No CPICH Received energy per chip divided by the power density in the band
CQI Channel Quality information
C-RNTI Cell RNTI
CSI Channel State Information
DCCH Dedicated Control Channel
DL Downlink
DM Demodulation
DMRS Demodulation Reference Signal
DRX Discontinuous Reception
DTX Discontinuous Transmission
DTCH Dedicated Traffic Channel
DUT Device Under Test
E-CID Enhanced Cell-ID (positioning method)
E-SMLC Evolved-Serving Mobile Location Centre
ECGI Evolved CGI
eNB E-UTRAN NodeB
ePDCCH enhanced Physical Downlink Control Channel
E-SMLC evolved Serving Mobile Location Center
E-UTRA Evolved UTRA
E-UTRAN Evolved UTRAN
FDD Frequency Division Duplex
FFS For Further Study
GERAN GSM EDGE Radio Access Network
gNB Base station in NR
GNSS Global Navigation Satellite System
GSM Global System for Mobile communication
HARQ Hybrid Automatic Repeat Request
HO Handover
HSPA High Speed Packet Access
HRPD High Rate Packet Data
LOS Line of Sight
LPP LTE Positioning Protocol
LTE Long-Term Evolution
MBMS Multimedia Broadcast Multicast Services
MBSFN Multimedia Broadcast multicast service Single Frequency Network
MBSFN ABS MBSFN Almost Blank Subframe
MDT Minimization of Drive Tests
MIB Master Information Block
MME Mobility Management Entity
MSC Mobile Switching Center
NPDCCH Narrowband Physical Downlink Control Channel
NR New Radio
OCNG OFDMA Channel Noise Generator
OFDM Orthogonal Frequency Division Multiplexing
OFDMA Orthogonal Frequency Division Multiple Access
OSS Operations Support System
OTDOA Observed Time Difference of Arrival
O&M Operation and Maintenance
PBCH Physical Broadcast Channel
P-CCPCH Primary Common Control Physical Channel
PCell Primary Cell
PCFICH Physical Control Format Indicator Channel
PDCCH Physical Downlink Control Channel
PDP Profile Delay Profile
PDSCH Physical Downlink Shared Channel
PGW Packet Gateway
PHICH Physical Hybrid-ARQ Indicator Channel
PLMN Public Land Mobile Network
PMI Precoder Matrix Indicator
PRACH Physical Random Access Channel
PRS Positioning Reference Signal
PSS Primary Synchronization Signal
PUCCH Physical Uplink Control Channel
PUSCH Physical Uplink Shared Channel
RACH Random Access Channel
QAM Quadrature Amplitude Modulation
RAN Radio Access Network
RAT Radio Access Technology
RLM Radio Link Management
RNC Radio Network Controller
RNTI Radio Network Temporary Identifier
RRC Radio Resource Control
RRM Radio Resource Management
RS Reference Signal
RSCP Received Signal Code Power
RSRP Reference Symbol Received Power OR Reference Signal Received Power
RSRQ Reference Signal Received Quality OR Reference Symbol Received Quality
RSSI Received Signal Strength Indicator
RSTD Reference Signal Time Difference
SCH Synchronization Channel
SCell Secondary Cell
SDU Service Data Unit
SFN System Frame Number
SGW Serving Gateway
SI System Information
SIB System Information Block
SNR Signal to Noise Ratio
SON Self Optimized Network
SS Synchronization Signal
SSS Secondary Synchronization Signal
TDD Time Division Duplex
TDOA Time Difference of Arrival
TOA Time of Arrival
TSS Tertiary Synchronization Signal
TTI Transmission Time Interval
UE User Equipment
UL Uplink
UMTS Universal Mobile Telecommunication System USIM Universal Subscriber Identity Module
UTDOA Uplink Time Difference of Arrival
UTRA Universal Terrestrial Radio Access
UTRAN Universal Terrestrial Radio Access Network
WCDMA Wide CDMA
WLAN Wide Local Area Network

What is claimed is:

1. A method performed by a network node which implements a Session Management Function in a 5G core network of a wireless communication network, the method comprising:
    receiving, at the network node, a request to establish a session for a device in a 5G Local Area Network (5GLAN) group;
    determining a user plane security policy for the session, based on a user plane security policy for the 5GLAN group, wherein the user plane security policy for the 5GLAN group specifies a policy for securing a user plane path of a session for any device in the 5GLAN group; and
    transmitting, from the network node to an access node of the wireless communication network, control signaling indicating the determined user plane security policy.

2. The method of claim 1, wherein, according to the user plane security policy for the 5GLAN group, a user plane security policy for a session of any device in the 5GLAN group is to be the same as a user plane security policy for a session of any other device in the 5GLAN group.

3. The method of claim 1, wherein said determining comprises determining the user plane security policy for the session to be the same as a user plane security policy for a different session or a different device in the 5GLAN group.

4. The method of claim 1, wherein, according to the user plane security policy for the 5GLAN group, a user plane security policy for a session of any device in the 5GLAN group is to specify a minimum level of security.

5. The method of claim 1, wherein the user plane security policy for the 5GLAN group indicates:
    whether confidentiality protection is required or not needed for securing a user plane path of a session for any device in the 5GLAN group; and/or
    whether integrity protection is required or not needed for securing a user plane path of a session for any device in the 5GLAN group.

6. The method of claim 1, wherein the user plane security policy for the 5GLAN group indicates:
    whether confidentiality protection is required, preferred, or not needed for securing a user plane path of a session for any device in the 5GLAN group;
    whether integrity protection is required, preferred, or not needed for securing a user plane path of a session for any device in the 5GLAN group.

7. The method of claim 1, further comprising obtaining the user plane security policy for the 5GLAN group from a node implementing an application function, a node in a data network, a node in an operations and support system (OSS) a node implementing a unified data management (UDM) function, or a node implementing a policy control function (PCF).

8. The method of claim 1, further comprising obtaining or generating the user plane security policy for the 5GLAN group during a procedure for establishing the session.

9. The method of claim 1, wherein the 5GLAN group is a restricted set of devices configured to privately communicate amongst each other via the respective sessions for the devices.

10. The method of claim 1, wherein the request indicates a data network name (DNN) associated with the 5GLAN group.

11. The method of claim 1, wherein the 5GLAN group is a restricted set of devices configured to privately communicate amongst each other via a 5GLAN type service.

12. A non-transitory computer readable storage medium comprising a computer program comprising instructions which, when executed by at least one processor of a network node which implements a Session Management Function in a 5G core network of a wireless communication network, causes the network node to:
    receive, at the network node, a request to establish a session for a device in a 5G Local Area Network (5GLAN) group;
    determine a user plane security policy for the session, based on a user plane security policy for the 5GLAN group, wherein the user plane security policy for the 5GLAN group specifies a policy for securing a user plane path of a session for any device in the 5GLAN group; and
    transmit, from the network node to an access node of the wireless communication network, control signaling indicating the determined user plane security policy.

13. A network node configured for use in a wireless communication network, the network node implementing a Session Management Function in a 5G core network of the wireless communication network and comprising:
    communication circuitry; and
    processing circuitry configured to:
        receive, at the network node, a request to establish a session for a device in a 5G Local Area Network (5GLAN) group;
        determine a user plane security policy for the session, based on a user plane security policy for the 5GLAN group, wherein the user plane security policy for the 5GLAN group specifies a policy for securing a user plane path of a session for any device in the 5GLAN group; and
        transmit, from the network node to an access node of the wireless communication network, control signaling indicating the determined user plane security policy.

14. The network node of claim 13, wherein, according to the user plane security policy for the 5GLAN group, a user plane security policy for a session of any device in the 5GLAN group is to be the same as a user plane security policy for a session of any other device in the 5GLAN group.

15. The network node of claim 13, wherein the processing circuitry is configured to determine the user plane security policy for the session to be the same as a user plane security policy for a different session for a different device in the 5GLAN group.

16. The network node of claim 13, wherein, according to the user plane security policy for the 5GLAN group, a user plane security policy for a session of any device in the 5GLAN group is to specify a minimum level of security.

17. The network node of claim 13, wherein the user plane security policy for the 5GLAN group indicates:
    whether confidentiality protection is required or not needed for securing a user plane path of a session for any device in the 5GLAN group; and/or
    whether integrity protection is required or not needed for securing a user plane path of a session for any device in the 5GLAN group.

18. The network node of claim 13, wherein the user plane security policy for the 5GLAN group indicates:

whether confidentiality protection is required, preferred, or not needed for securing a user plane path of a session for any device in the 5GLAN group;

whether integrity protection is required, preferred, or not needed for securing a user plane path of a session for any device in the 5GLAN group.

19. The network node of claim 13, wherein the processing circuitry is further configured to obtain the user plane security policy for the 5GLAN group from a node implementing an application function, a node in a data network, a node in an operations and support system (OSS) a node implementing a unified data management (UDM) function, or a node implementing a policy control function (PCF).

20. The network node of claim 13, wherein the processing circuitry is further configured to obtain or generate the user plane security policy for the 5GLAN group during a procedure for establishing the session.

21. The network node of claim 13, wherein the 5GLAN group is a restricted set of devices configured to privately communicate amongst each other via the respective sessions for the devices.

22. The network node of claim 13, wherein the request indicates a data network name (DNN) associated with the 5GLAN group.

23. The network node of claim 13, wherein the 5GLAN group is a restricted set of devices configured to privately communicate amongst each other via a 5GLAN type service.

24. The method of claim 1, wherein individual user plane security policies for the respective devices in the 5GLAN group are to specify respective extents to which user plane paths of sessions for devices in the 5GLAN group are to be secured, and wherein the user plane security policy for the 5GLAN group specifies that:

the individual user plane security policies for the respective devices in the 5GLAN group are to be the same; or for each of the devices in the 5GLAN group, the individual user plane security policy for the device is to specify at least a minimum extent to which the user plane path of the session for the device is to be secured.

\* \* \* \* \*